(12) United States Patent
Voris et al.

(10) Patent No.: US 10,004,984 B2
(45) Date of Patent: Jun. 26, 2018

(54) INTERACTIVE IN-ROOM SHOW AND GAME SYSTEM

(71) Applicant: DISNEY ENTERPRISES, INC., Burbank, CA (US)

(72) Inventors: Jeffrey Voris, Los Angeles, CA (US); Mark A. Reichow, Glendale, CA (US); John David Smith, Burbank, CA (US); Zachery W. Kennedy, Los Angeles, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 36 days.

(21) Appl. No.: 15/339,602

(22) Filed: Oct. 31, 2016

(65) Prior Publication Data
US 2018/0117465 A1 May 3, 2018

(51) Int. Cl.
| A63F 13/26 | (2014.01) |
|---|---|
| A63F 13/211 | (2014.01) |
| A63F 13/28 | (2014.01) |
| A63F 13/52 | (2014.01) |
| A63F 13/213 | (2014.01) |
| A63F 13/218 | (2014.01) |

(Continued)

(52) U.S. Cl.
CPC .............. *A63F 13/26* (2014.09); *A63F 13/21* (2014.09); *A63F 13/211* (2014.09); *A63F 13/213* (2014.09); *A63F 13/215* (2014.09); *A63F 13/218* (2014.09); *A63F 13/25* (2014.09); *A63F 13/28* (2014.09); *A63F 13/52* (2014.09)

(58) Field of Classification Search
CPC ....... G06G 5/377; A63F 13/21; A63F 13/211; A63F 13/213; A63F 13/215; A63F 13/26; A63F 13/28
See application file for complete search history.

(56) References Cited

U.S. PATENT DOCUMENTS

| 3,689,139 A | 9/1972 | Gross et al. |
|---|---|---|
| 4,184,755 A | 1/1980 | Burgess et al. |

(Continued)

FOREIGN PATENT DOCUMENTS

| CN | 102012623 | 4/2011 | |
|---|---|---|---|
| GB | 2414419 A | * 11/2005 | ............. A63F 13/12 |

(Continued)

*Primary Examiner* — David Duffy
(74) *Attorney, Agent, or Firm* — Marsh Fischmann & Breyfogle LLP; Kent A. Lembke

(57) ABSTRACT

An interactive in-room show and game system configured to provide engaging and immersive multimedia shows or presentations in a room. The in-room show and game system generally includes a controller for selectively operating a display device, a video projector, an audio system (e.g., one or more speakers), and other show components (e.g., one or more lights, a fan, a mechanical device, and so on). Media content is predefined or generated in real time for the room, and the controller operates (such as in response to a triggering switch or remote control device that may take the form of a show prop activated by someone in the room) to serve the media content interactively, based on user input sensed in the room by one or more sensors of a sensor assembly, to tell a story and/or magically transform the space into a multidimensional and immersive entertainment or gameplay space.

16 Claims, 8 Drawing Sheets

(51) Int. Cl.
  *A63F 13/215* (2014.01)
  *A63F 13/25* (2014.01)
  *A63F 13/21* (2014.01)

(56) References Cited

U.S. PATENT DOCUMENTS

| | | | |
|---|---|---|---|
| 5,642,423 A * | 6/1997 | Embree | H04S 3/02 |
| | | | 381/19 |
| 6,611,297 B1 * | 8/2003 | Akashi | H04N 21/4131 |
| | | | 348/602 |
| 7,550,935 B2 | 6/2009 | Lys et al. | |
| 7,871,192 B2 | 1/2011 | Chien | |
| 8,130,330 B2 * | 3/2012 | Tan | H04N 5/144 |
| | | | 345/629 |
| 8,133,103 B2 * | 3/2012 | Ciarrocchi | A63F 13/08 |
| | | | 463/1 |
| 8,579,685 B2 * | 11/2013 | Ciarrocchi | A63F 13/08 |
| | | | 463/1 |
| 8,624,954 B2 * | 1/2014 | Robinson | H04N 7/15 |
| | | | 348/14.01 |
| 8,879,782 B2 | 11/2014 | Garlington et al. | |
| 9,480,907 B2 * | 11/2016 | Benko | A63F 13/00 |
| 9,536,493 B2 * | 1/2017 | Cheon | G09G 3/002 |
| 9,836,266 B2 * | 12/2017 | Cheon | G06F 3/1423 |
| 2003/0227765 A1 | 12/2003 | Kubo | |
| 2005/0116968 A1 * | 6/2005 | Barrus | H04N 9/3147 |
| | | | 345/698 |
| 2005/0128751 A1 | 6/2005 | Roberge et al. | |
| 2006/0221593 A1 | 10/2006 | Alden | |
| 2007/0126864 A1 * | 6/2007 | Bhat | H04N 5/144 |
| | | | 348/51 |
| 2007/0126938 A1 * | 6/2007 | Tan | H04N 5/144 |
| | | | 348/739 |
| 2007/0141545 A1 * | 6/2007 | Tan | H04N 5/144 |
| | | | 434/365 |
| 2007/0211475 A1 | 9/2007 | Sevack et al. | |
| 2008/0018792 A1 * | 1/2008 | Bhat | G06T 13/40 |
| | | | 348/578 |
| 2008/0042969 A1 | 2/2008 | Baker | |
| 2008/0136973 A1 | 6/2008 | Park | |
| 2008/0297591 A1 * | 12/2008 | Aarts | G06F 1/1601 |
| | | | 348/51 |
| 2009/0015799 A1 | 1/2009 | Luciano | |
| 2009/0073694 A1 | 3/2009 | Scannell, Jr. | |
| 2009/0141370 A1 | 6/2009 | Takaura et al. | |
| 2009/0190044 A1 | 7/2009 | Chu et al. | |
| 2009/0209308 A1 * | 8/2009 | Ciarrocchi | A63F 13/08 |
| | | | 463/1 |
| 2010/0044467 A1 | 2/2010 | McGuire | |
| 2010/0074284 A1 | 3/2010 | Aizawa et al. | |
| 2010/0128112 A1 * | 5/2010 | Marti | G06F 3/011 |
| | | | 348/51 |
| 2010/0226617 A1 | 9/2010 | Piccionelli | |
| 2011/0107216 A1 * | 5/2011 | Bi | G06F 3/011 |
| | | | 715/716 |
| 2012/0044467 A1 | 2/2012 | Nakayama et al. | |
| 2012/0058725 A1 | 3/2012 | Pan | |
| 2012/0106151 A1 | 5/2012 | Vissenberg et al. | |
| 2012/0188451 A1 | 7/2012 | Schmidt et al. | |
| 2012/0223885 A1 * | 9/2012 | Perez | G06F 3/011 |
| | | | 345/158 |
| 2012/0258789 A1 * | 10/2012 | Ciarrocchi | A63F 13/08 |
| | | | 463/25 |
| 2012/0274727 A1 * | 11/2012 | Robinson | H04N 7/15 |
| | | | 348/14.07 |
| 2013/0083298 A1 | 4/2013 | Yoshimura et al. | |
| 2014/0043516 A1 | 2/2014 | Baker | |
| 2014/0051510 A1 * | 2/2014 | Benko | A63F 13/00 |
| | | | 463/31 |
| 2016/0219338 A1 * | 7/2016 | Wang | H04N 21/4788 |
| 2016/0371884 A1 * | 12/2016 | Benko | G06T 19/006 |

FOREIGN PATENT DOCUMENTS

| | | |
|---|---|---|
| JP | 2005099588 | 4/2005 |
| JP | 2006227143 | 8/2006 |
| WO | 2011117691 | 9/2011 |

* cited by examiner

INTERACTIVE IN-ROOM SHOW AND GAME SYSTEM

BACKGROUND

1. Field of the Description

The present description relates, in general, to entertainment and show systems and, more particularly, to an interactive show system (e.g., an interactive in-room entertainment or show system) for transforming any space (or any room), such as a game or activity room, into a location for a multimedia show presentation and gaming experience.

2. Relevant Background

There are many settings where it is desirable to entertain people in a room or similar space. For example, people have long been going to special facilities to celebrate a special event such as a birthday. Entertainment typically is limited to special decorations associated with the particular event (e.g., "Happy Birthday" banners and the like), and the decorations may be themed (e.g., the person having a birthday may really enjoy a particular superhero or movie, love particular animals, live to play a particular sport, and so on). The entertainment may also include playing of music suited to the event or the party's theme, and food themed to the event or party's theme may also be provided. Typically, though, the entertainment provided in such activity or party rooms is preset and does not change during the party or event.

In other settings, in-room entertainment may involve playing video games. The game player may operate a game controller, and a display device with a sound system reacts to user input on the game controller to change the display and output audio on the sound system to reflect the interactive game play. In other cases, sensors, such as a pressure sensor in a mat for a dance-based game, a motion sensor that may be handheld for a sports or action game, and the like, act to identify movements of the game players, and the game engine acts to update the display and output audio based on these sensed movements/actions of the game player. Some of these games are labeled interactive story games or interactive movie games as the story or movie can be changed by ongoing or occasional user input. However, the interactivity typically is limited to operating the controller or interacting with the visual display (e.g., player typically faces a television, a computer monitor, or the like and cannot move from a certain space), and the game system generally only changes what is displayed on the visual display and output over the audio system during game play. The room itself remains unchanged as the main feature of most existing video games is to allow a user to interact with and manipulate items on a screen such as by using motion sensing to allow gesture recognition and pointing.

SUMMARY

Briefly, the inventors discovered that the possibility of offering more complex and interesting in-room entertainment experiences had not previously been explored. With this in mind, the inventors created an interactive in-room show and game system that is configured to provide engaging and immersive multimedia shows or presentations or gaming experiences in nearly any space (or "room") that is defined by one or more walls. For example, but not as a limitation, the new system may be provided in an activity room at a facility used to host special events such as birthday parties, may be provided in a game or entertainment room at a facility providing immersive and interactive gaming experiences, and/or may be provided for use at home (e.g., in the game room of a person's house and so on).

The interactive in-room show and game system generally includes a controller for selectively operating a display device (e.g., a television or the like), a video projector, an audio system (e.g., one or more speakers), and other show/game components (e.g., one or more lights (which may include black lights), a fan, a mechanical device (e.g., mechanical props), electrical devices (e.g., illusionary props), and so on). Media content is predefined for the room and/or is provided in real time to suit the room (e.g., interactive story/movie or game content is modified based on user input (which may be sensed input)). The system includes a sensor assembly for gathering user input or information pertaining to "users" (people in the room), and the controller operates (such as in response to a triggering switch or remote control device that may take the form of a show prop activated by someone in the room, to a sensed movement of someone in the room, to someone in the room saying a character's name, to someone's face being recognized and/or as having a particular emotion (happy, sad, and so on), and so on) to serve the media content to tell a story, to present an interactive game, and/or magically transform the space into a multidimensional and immersive entertainment space.

The operations of the in-room show system may, for example, involve the triggering device or remote control being operated to activate a particular show (or set of content) or may involve a sensor in the sensor assembly detecting the presence of a certain person (e.g., with facial recognition) or a particular action (e.g., movement into a space within the room, waving an arm, moving a game piece a certain way, and so on). In response, the controller may operate the display device (or television) to display a first set of visual content (e.g., a still or video image) while the audio system is operated to provide a paired set of audio content. The controller may next act to cause the projector to project a second set of visual content (light from the projector projects still or video images) onto surfaces of the room next to or adjacent to the display device such that these images appear to originate from and be expanding outward from the display device. The audio content played by the audio system may be chosen to suit the new projected content as well as that provided by the display device.

At this point in operations, the display device and projector may both be providing video (or still) imagery that is synchronized and/or matched to tell a single story or set a single scene. The controller may next (or concurrently) operate the other show components to make the show or game presentation more rich and exciting such as by turning lights on or off, by changing the brightness of lights, by changing light colors, by turning a fan on or off or to a higher or lower setting to provide a wind effect, by activating a mechanical or electrical device in the room (e.g., a mechanical toy may start operating or a picture frame with lights may be turned on/off), and so on.

The activation of any of these show components may by synchronized with the projected or displayed content, e.g., to have a streak of light be projected, from an object or character displayed by the display device, by the projector to "strike" a lamp that is then illuminated (turned on) by the controller (e.g., a projected stream of stars from a wand could pass over a location of a lamp in the room causing it to be ignited or turned on at a particular color and brightness). In this way, the different types of media and show/game system components may appear to interact to provide the new interactive in-room entertainment experience or the new interactive in-room gaming experience.

More particularly, a system is described for providing interactive entertainment with multimedia content matched to a particular room. The system includes a display device positioned in a room and also includes a projector positioned in the room for projecting on one or more surfaces in the room. Further, the system includes an audio system for providing audio output into the room, and, for interactivity, a sensor assembly is provided that includes one or more sensors sensing user input in the room. A controller is used for processing the user input sensed by the sensor assembly.

In response, the controller operates (based on the user input and further based on a file defining display content, projector content, and audio content for an interactive experience) the display device to display the display content, the projector to project the projector content onto the one or more surfaces in the room, and the audio system to output the audio content for the interactive experience into the room. In some embodiments, the sensors include at least one of a motion sensor, a pressure sensor, a microphone, and a camera, and the user input includes at least one of motion of a person or object, determining a position of an object or person in a location in the room, facial recognition, audio recognition, and person or object identification.

In some implementations of the system, the display content, the projector content, and the audio content are time synchronized to each other based on a timeline for the interactive experience. The projector content is mapped (e.g., using projection mapping techniques) to the one or more surfaces in the room. The display device may include a television mounted on a wall of the room. The projector content may include video content (which may be live video, CG animation, or the like) matching the display content displayed on the television, and the display device and the projector are typically concurrently operated for at least a portion of the interactive experience. The projection mapping in some cases includes the television, and the video content includes a blacked out area coinciding with an area of the wall where the television is mounted, whereby light output from the projector is projected on surfaces of the wall excluding the television.

Further, the audio system includes speakers spaced around the room to provide surround sound, and the audio content includes a soundtrack matching both the display content and the projector content. The system may also include a lighting system with lighting elements that are independently operable to turn on and off, to have a range of brightness, and to have two or more colors. In such cases, the file (e.g., show file or game program/file) defines lighting for the interactive experience, and the controller operates each of the lighting elements to provide the lighting defined by the file.

According to another aspect of the description, a method is taught for providing interactive in-room entertainment. The method includes, with a sensor, sensing user input from a person in a room. Then, based on the sensed user input, displaying a first set of content, and further based on the sensed user input, projecting a second set of content on one or more surfaces of the room. The method also includes playing a soundtrack associated with the first and second content, and, based on the sensed user input, lighting the room.

In some implementations of the method, the first and second content are time synchronized and are defined by a show or game file. In such implementations, during the displaying and the projecting, the first and second content share a subset of content whereby the subset of content moves between a display device and one or more surfaces of the room. Also, the method may be implemented such that the lighting of the room varies in brightness or color during the displaying and projecting steps. In the same or differing implementations, the second set of content is mapped to the one or more surfaces of the room, the display device includes a television on a wall, and the second set of content includes a blacked out area associated with the television to limit projection of light onto the television. In many cases, the sensor includes at least one of a motion detector, a pressure sensor, a microphone, and a camera, and the sensing includes, respectively, one of detecting motion, detecting location of the person or an object in the room, receiving and processing speech of the person in the room, and processing an image of the room.

DETAILED DESCRIPTION OF THE PREFERRED EMBODIMENTS

Figure 1:
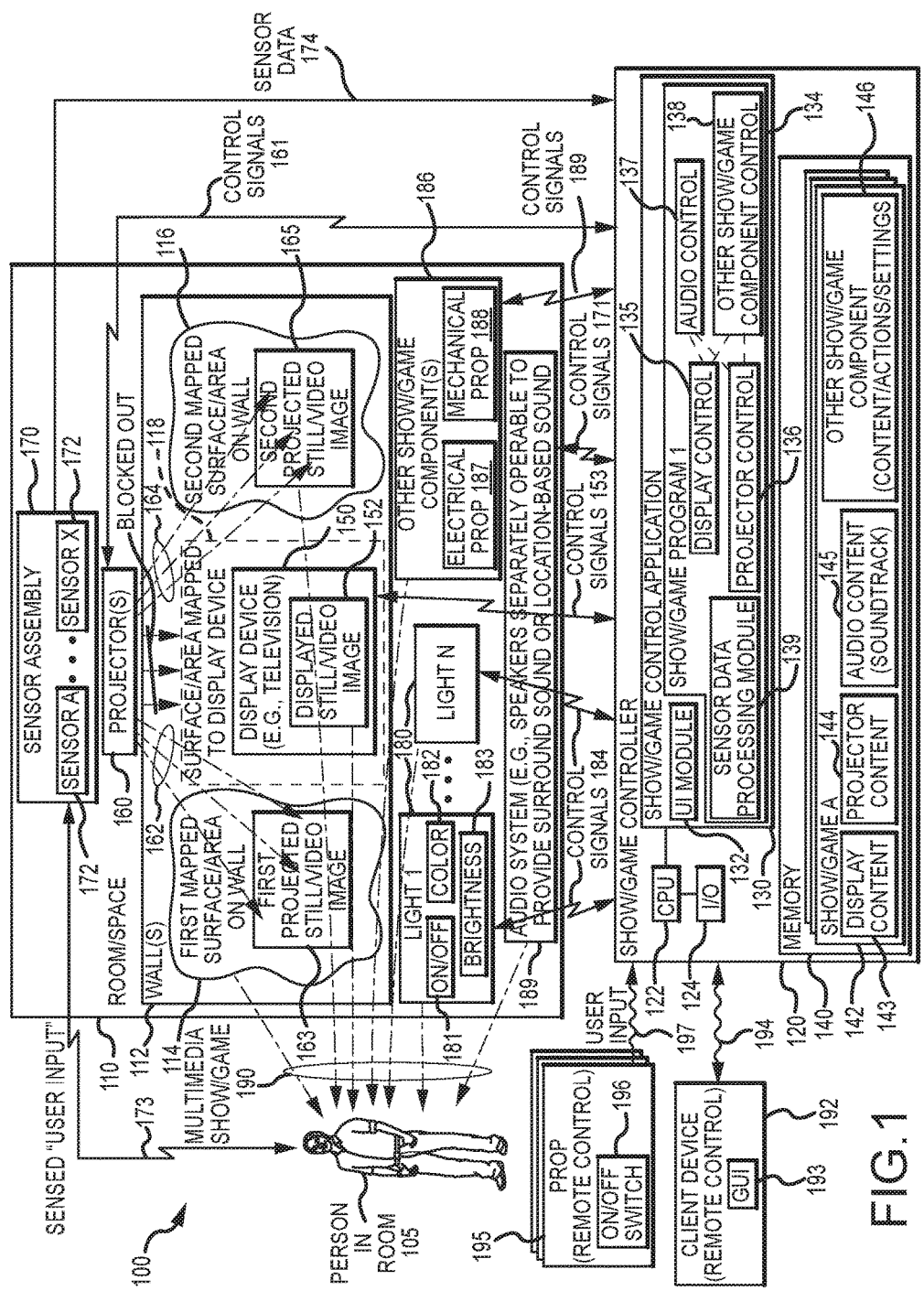
FIG. 1 is a functional block diagram of an interactive in-room show and game system (or entertainment system) of the present description.

Briefly, a system is described for providing an interactive multimedia show presentation or interactive gaming experience (or for providing multimedia in-room entertainment) in a space or room. The system may be provided, in part, with a computer system (e.g., a show-controller type computer system with a game engine) that is provided in a room, which may include nearly any space with one or more walls such as a room at an event center, a gaming room at an entertainment facility, a room in a person's house, and so on. The room is augmented with environmental effects, which may be selected, generated, and/or modified based on user input detected by a sensor assembly, coordinated by the system to enable programmed effects and show-style in-room entertainment and gaming.

The inventors recognized that most rooms are blank slates for the system of the present description and can readily be enhanced by the multimedia show content provided by the new interactive in-room show and game system. However, prior to the use of the in-room show system, this blank slate has remained unused or ignored. In some operational modes, the projection mapped and dimensional audio enhancements provided by the system are triggered programmatically and/or by timing triggers.

In some preferred implementations or operational modes, an enhancement is triggered in response to data collected by the sensor assembly (and provided for processing to the show and game controller). For example, the sensor assembly may include sensors for sensing in-room activity that may be used as triggers such as a person sitting down in a particular chair, opening or closing a door (e.g., coming into the room), a person moving a game or show prop, and the like. The sensor assembly and controller (e.g., with sensor-processing software) may be configured for integration of existing (and future) sensor technology, and the sensor assembly may include location sensors, motion sensors, pressure sensors, sound sensors, visual recognition sensors/cameras, and the like. The signals/data from these sensors may be processed and used as triggers for room enhancements such as playback of programmed show/game material (e.g., video and/or audio content) or real-time rendering a file and then playing it (or playback of rendered file) such as in a game setting.

The variety of actions that can be triggered by the system in response to sensed "user input" or actions is nearly unlimited, but it may be useful prior to describing exemplary systems to provide one simple example. A person having a birthday may have a strong interest in a superhero that can fly, and the system can include multimedia content that is themed to this superhero. The sensor input that triggers an enhancement to the room may vary, but one embodiment may use a microphone(s) to perceive sounds within the room including people speaking. The system could be programmed such that every time the name of the flying superhero is detected as being spoken an augmentation is triggered. For example, the system may playback a multimedia "show" such as providing projection mapped animation of the superhero flying through the room (e.g., projection onto at least one wall of the room and its surfaces). Further, when the superhero "touches" objects/show props in the room, these may be activated to be operated, e.g., a light may be illuminated or change color or brightness, a bell may ring, a mechanical toy/device may operate for a period of time, a digital picture frame may display a still or video image, and so on. The audio system may operate to playback a soundtrack corresponding with "movement" of the superhero through the room by providing sounds that originate from a source near the present location of the projected animation of the superhero or otherwise show the "presence" of the superhero in the room.

In another example, the sensor assembly senses when a book is removed from a shelf and identifies the book, and the system acts to choose a show that themes the room to the particular book or even begins telling the story of the book (or reading its pages). In other cases, interactive games including board games and video games that leap from the television monitor onto adjoining walls and other surfaces may be provided by operation of the new system and its sensor assembly (e.g., a user may operate a remote control (e.g., a device providing a GUI) to select a game to play, and the system may use its sensor assembly to identify the user's input (or actions taken to interact with animation/video projected on the room's surfaces) and react with real-time rendering of new/modified content (e.g., projection mapped animation and matching soundtrack from the system's projector(s) and audio system)).

A typical implementation of an interactive in-room show and game system includes devices such as dimensional audio (e.g., an audio system providing surround sound to allow sounds to seem to come from different directions/sources in the room), programmable lighting (e.g., lamps with light emitting diodes (LEDs) or the like such as, but not limited to, a controllable lighting system such Philips Hue or similar lighting devices), a television, and a projector (e.g., one or more hidden microprojector), and each of these system devices is coupled to the in-room show and game controller that coordinates their operations. Programming and content can be pushed to a room over a network connection and/or stored in memory accessible by the controller in advance to being run on a preset schedule or in response to a selection (e.g., operation of a remote control or triggering device) by someone in the room (or a "user" or "game player"). The interactive in-room show and game system combines a number of show technologies that may be used in stage shows, theaters, and the like and integrates these technologies in a unique manner to provide a multimedia show or gaming experience in a predefined or known space or "room" such as an event room or gaming room.

The display device may take the form of a conventional television, such as a high definition (HD) liquid crystal display (LCD), an organic LED (OLED) display, or the like. However, the interactive in-room show and game system provides a unique entertainment experience through the inclusion of a hidden projector(s) and a dimensional audio system that in combination with the display device can transform room surfaces by projection mapping backgrounds and dynamic content into the room. For example, in an interactive game example, the game player may operate a remote control (or otherwise provide input such as using a touchscreen/pad, saying the name of the game, and so on) to select a game to play and initiate the selected game. The system may display initial game content on the display device and provide corresponding audio.

The system with its controller act to display later (or a second set of) content using the projector to provide projection mapped animation (or video) on wall surfaces around the display device. Other show components can be operated to transform the entire room (or portions of it) into an interactive game space such as by operating the lights (darken or brighten all or portions of the room), operating game/show props (operate a thermostat to cool/heat the room to suit game situations/content, operate a fan when it is windy in the game (e.g., when the player is flying through space, riding a vehicle or horse), cause sounds to come from sources spaced apart from the display device, and the like), and so on. The multimedia content may be selected and/or rendered in response to user input or activity within the room that is sensed by one or more of the sensors in the sensor assembly. For example, the game may involve role playing the part of a superhero, and the game player may interact with objects or characters in the game that are projected onto the wall or with other game props in the room. This "interaction" (e.g., moving to a position near the location of the projected object/character and moving their arms relative to that projected object/character) may be sensed and processed to select or generate new content for use in providing the interactive game in the room (such as by modifying what is projected, by changing the audio content, by updating a game score, by changing the operation of the lights or other show/game components, and so on). In other cases, gaming can be augmented such as with playing projection enhanced board games, and the projected and displayed images as well as audio track output from the surround sound audio system provide an immersive multimedia show/game experience that can fill the entire room (or at least be provided using an entire wall as a display surface).

FIG. 1 is a functional block diagram of an operating interactive in-room show and game system 100 of the present description that is operable to provide multimedia show, gaming, or entertainment experiences to a guest or person 105 in a room/space 110 as shown with the combination of system outputs (represented by arrows 190). The room/space 110 may take a wide variety of forms to practice the system 100 but typically will include one or more walls 112 defining or enclosing interior volume of the room 110. The wall 112 includes a first surface or area 114, a second surface or area 116, and a surface or area 118 associated with the location of a display device 150 on or near a portion of the wall 112, and each of these areas is predefined and used in designing an interactive show or game to map where projected content should be provided to achieve a desired visual effect/show and where content should not be projected or be blocked as is the case for the area 118 (e.g., to avoid projecting light onto the display device 150 and interfering with its displayed image(s) 152). A person or "guest" 105 is in the room 100 and perceives the interactive multimedia show or game 190.

The interactive in-room show and game system 100 includes a show/game controller 120 that may take the form of a programmed computer system (or other electronic device) with a processor 122 managing operations of I/O devices 124, running code or software programs to provide a show/game control application 130, and managing memory/data storage 140 (which may be in the system 120 or be accessible over a network or communication link). The I/O devices 124 may include input and output devices such as a keyboard, a mouse, a touchscreen, a monitor, voice recognition software, and the like that allows an operator of the show/game controller 120 to provide user input and/or to initially configure the show/game controller 120 for automated operations such as by loading the software associated with the show/game control application 130 onto computer readable media of the show/game controller 120 and initiating operations of the controller 120 including running the show/game control application 130.

The show controller 120 includes memory 140 that is used to store files defining one to many shows/games 142 that may be provided to generate one or more multimedia shows\games 190 for a viewer/guest 105. The show/game control application 130 may include a game engine or the like to render content (such as display and projector content 143, 144) for a show or game in real time (e.g., in response to receipt and processing of sensor data 174 from the sensor assembly 170). Each show/game 142 includes content 143 for operating or playing on a display device 150, content 144 for projecting with the projector 160, audio content or a soundtrack for playing over an audio system 170, and other show\game component content, actions, and/or settings 146 for use by the controller 120 in operating other show/game components 186 (e.g., the programmable and/or independently operable lights 180, electrical props 187, mechanical props 188, a fan(s), a heating/cooling system in the room 110 to affect in-room temperatures to match a presented scene/setting, and the like).

The display device 150 may take the form of a conventional television (e.g., an LCD flat screen) or another image display device(s) that is mounted on the wall 112 or positioned in the room 110 on or blocking a surface or area 118 on the wall 112. During operation of the system 100, the show/game controller 120 runs a show\game program 134 that includes a set of display controls 135, which are used to determine when and how to operate the display device 150 to provide the displayed still or video image 152 using the content 143. The control is achieved with control signals 153 transmitted in a wired or wireless manner from the I/O devices 124 of the show/game controller 120 to the display device 150. For example, the display controls 135 may define timing of particular portions of the content 143 and/or define a start time for playing all of the display content 143.

The show/game system 100 further includes a projector 160 that is operated by the show/game controller 120 via wired/wireless control signals 161. The projector 160 may be a microprojector that is hidden from view by the viewer/guest 105, and the projector 160 may be a video projector capable with a relatively high lumen output rating and/or be selected for its high definition output. In any case, the show/game program 134 includes a set of projector controls 136 that define timing of operation of the projector 160 with signals 161 to project all or predefined portions of the projector content 144. For example, the display device 150 may be operated initially (or at time zero in the show) to provide a displayed video image 152, and, at some predefined later time, the projector 160 may be operated to project 162 with content 144 a first projected still or video image 163 onto a first mapped surface or area 114 on the wall 112.

At the same or another later time, the projector 160 may be operated with signals 161 to project 164 with content 144 (that may be the same or differ from the content 144 used to provide first images 163) to create second projected still or video images 165 onto a second mapped surface or area 116 of the wall 112 (which will typically differ at least partially from the first area 114). In this way, the projector content 144 is mapped to particular surfaces/areas of the wall 112 (or video content is provided using projection mapping, which typically includes a mapping of the various content/images (still or video) to areas/surfaces of wall(s) 112) and different content can be provided on the various surfaces of the wall 112 to tell a story, create a desired show environment, and/or provide interactive video game play. To avoid interference with the displayed image 152 being provided on the display device 150, the area 118 on the wall 112 associated with the display device 150 may be blocked out or blacked out in the output of the projector 160 via projector content 144 and control signals 161 (e.g., light is not projected onto the display device 150 (unless desirable for some particular visual effect)).

The show/game system 100 also includes an audio system 170 in the room 110 that is configured, typically, with one or more speakers that can be independently and concurrently operated to provide surround sound or location-based sound effects perceivable by the viewer 105. The show/game file 142 includes audio content or a soundtrack 145 (or this may be generated in real time such as with a game engine or the like based on sensor data 174), and the show program 134 includes a set of audio controls defining the timing of playing particular portions of the soundtrack 145 (or when to start the soundtrack (again, this may be generated in near real-time by the show/game control application 130 in response to processing of sensor data 174) for playback) with the audio system via control signals 171 from the show/game controller 120. The playback of the soundtrack or audio content 145 may be time synchronized with a particular displaying of an image 152 by display device 150, with a particular projection 162, 164 of an image 163, 165 by the projector 160, and/or operation of the lights 180 or other show components 186.

Further, the show/game system 100 includes a set of lights 180 that are controllable (e.g., independently controllable) based on the show/game program 134, based on processing of sensor data 174 by the sensor data processing module 139, and its other show component controls 138. For example, the lights 180 may each be a lighting device that can be controlled with control signals 184 to be turned on or off such as at a particular time in a show or game that is synchronized with another show or game event such as display of a particular image 163, 165 (which may be near the light 180 on area 114 or 116). One or more of the lights 180 may also be controllable with the signals 184 from controller 120 to have a particular color or color state/setting 182 (e.g., to change color over time during the timeline of the show or game or in response to a sensed user input 173 from person 105) and, again, the changing of the color setting 182 may be time synchronized with another show/game event. Further, one or more of the lights 180 may have its brightness or brightness level/setting 183 set or controlled (or changed over time) based on control signals 184 from the show/game controller 120 based on program-based control 138 (which may be defined by other show/game component content/actions/settings 146 for the show/game file 142 for the current show or interactive game). In this way, lighting of the room 110 can be provided by the programmatic control of the lights 180 to achieve lighting in a room space similar to that achieved in theatrical shows and/or to achieve unique effects (e.g., dim the lights in a room 110, gradually brighten and change the color of the lights 180, to light a lamp 180 when a projected image 163, 165 flies into or near the location of the lights (which may be mapped to the projection areas 114, 116), and so on).

The show/game system 100 may also include other show/game components 186 that are placed in or near the room 110 to enhance show or game 190. The other components 186 may include electrical props 187 (e.g., a display, an electronic sound effect device, and so on) and/or mechanical props 188 (e.g., a fan, a HVAC system/component, a robotic toy, and so on). Each of these components 186 may be separately and/or concurrently operable via control signals 189 from the show/game controller 120 based on a set of controls 138 that define when and how the components 186 are to be operated (e.g., as may be defined by the other show/game component content/actions/settings 146 in show/game file 142 for the current show or game being provided in the room 110).

The show/game system 100 further includes a sensor assembly 170 positioned in or near the room 110. The sensor assembly 170 includes one-to-many sensors 172 that each functions to gather a set of sensed "user input" 173, which is passed (with or without processing at the sensor 172 or in assembly 170) as sensor or sensed data 174 to the show/game controller 120 for processing by a sensor data processing module 139 of the show/game program 134. The sensor data 174 is gathered to allow the person 105 in the room 110 to have an interactive experience and/or to modify the show/game 190 based on sensed input 173. Hence, the term "user input" is used to encompass any parameter of the room that can be sensed with a sensor 172 and used to trigger an augmentation of the space/room 110 with selective operation of the show/game system 100 by the controller 120.

The sensors 172 may take a wide range of forms to practice the system 100. For example, one or more of the sensors 172 may be a motion detector that senses motion of the person 105 in a particular area of the room 110. The corresponding sensor data 174 may be processed by the module 139, and, in response, the controller 120 may generate signals 153, 171, 184, and/or 189 to modify the show 190 (or to select a show/game file 142 for playback) in response to the sensed motion. In other cases, the person 105 may hold a prop or game controller 195, and its motion and other movement/position sensing may be provided by conventional video game components (e.g., a motion bar combined with the handheld game controller) to sense the movement of the prop/controller 195. The sensor data 174 may be processed by the module 139, and the controller 120 may modify the multimedia show/game 190 in response to this sensed user input 173 to provide an interactive game throughout the room 110 with multimedia content (not just what is on display device 150 and provided by sound system 189). Other sensors 172 may include a camera such that visual images 173 of the user 105 are gathered and transmitted in the sensor data 174 for processing by the sensor data processing module 139 (e.g., a visual/image recognition program or the like). The sensors 172 may also include pressure and other sensors for obtaining sensed user input 173.

As shown, the show/game control application 130 may run one or more show/game programs 134, and the memory 140 may store one-to-many show/game definitions or show/game-defining files 142. A default program 134 may be run that chooses the appropriate show/game files 142 to provide content. In other cases, though, the show/game program 134 (and associated file(s) 142) is chosen in response to user input 173, 194, and/or 197 that is processed by a user interface (UI) module 132 of the show control application 130 or by the sensor data processing module 139.

Particularly, the show/game system 100 may include a client device 192 (e.g., a handheld computing device, a touchscreen input device, a remote control with touchscreen or buttons, and so on) that may be operated by a guest/viewer 105 in the room 110 to initiate one or more of the shows 142. For example, the UI module 132 may serve a graphical user interface (GUI) as shown at 194 to the client device 192, which acts to display the GUI 193 to the viewer 105 via a screen of the client device 193. The guest/viewer 105 may then select (e.g., with an input device of the client device 192) one show/game 142 from a listing of available interactive shows/games in the room 110. This may result in user input 194 being transmitted to the show/game controller 120 for processing by the UI module 132 to identify a show/game program 134 to run and, in turn, one or more of the show/game files 142 that are used by the program 134 in providing a multimedia show/game 190 to the guest 105.

In other cases, one or more props (or remote controls) 195 may be provided in the room 110, and each prop/remote control 195 may have an on/off switch (or activation element) 196 that can be operated to cause user input 197 to be provided to the controller 120. The UI module 132 of the control application 130 may process the input 197 to identify (e.g., via a prop ID in the message/user input 197) the prop 195 that has been activated or turned on, and, in response, to select a show or game program 134 to run (which, in turn, retrieves a show or game file 142 and its defined content 143-146) to provide a multimedia show or game 190. In this way, each prop/remote control 195 can be used to trigger its own show/game 190.

For example, a person may bring in a prop 195 (e.g., a lantern, a prop associated with gameplay (video or board), and so on) that they "turn on" with switch/activation element 196 to signal 197 the controller 120 to run a particular show or game program 134. The program 134 may cause the controller 120 to selectively operate the display device 150, the projector 160, the audio system 170, the lights 180, and the other show/game components 186 to provide the multimedia show or interactive game 190 (e.g., to transform the room 100 into an environment matched to or suited to the interactive story/show or game).

Figure 2A:
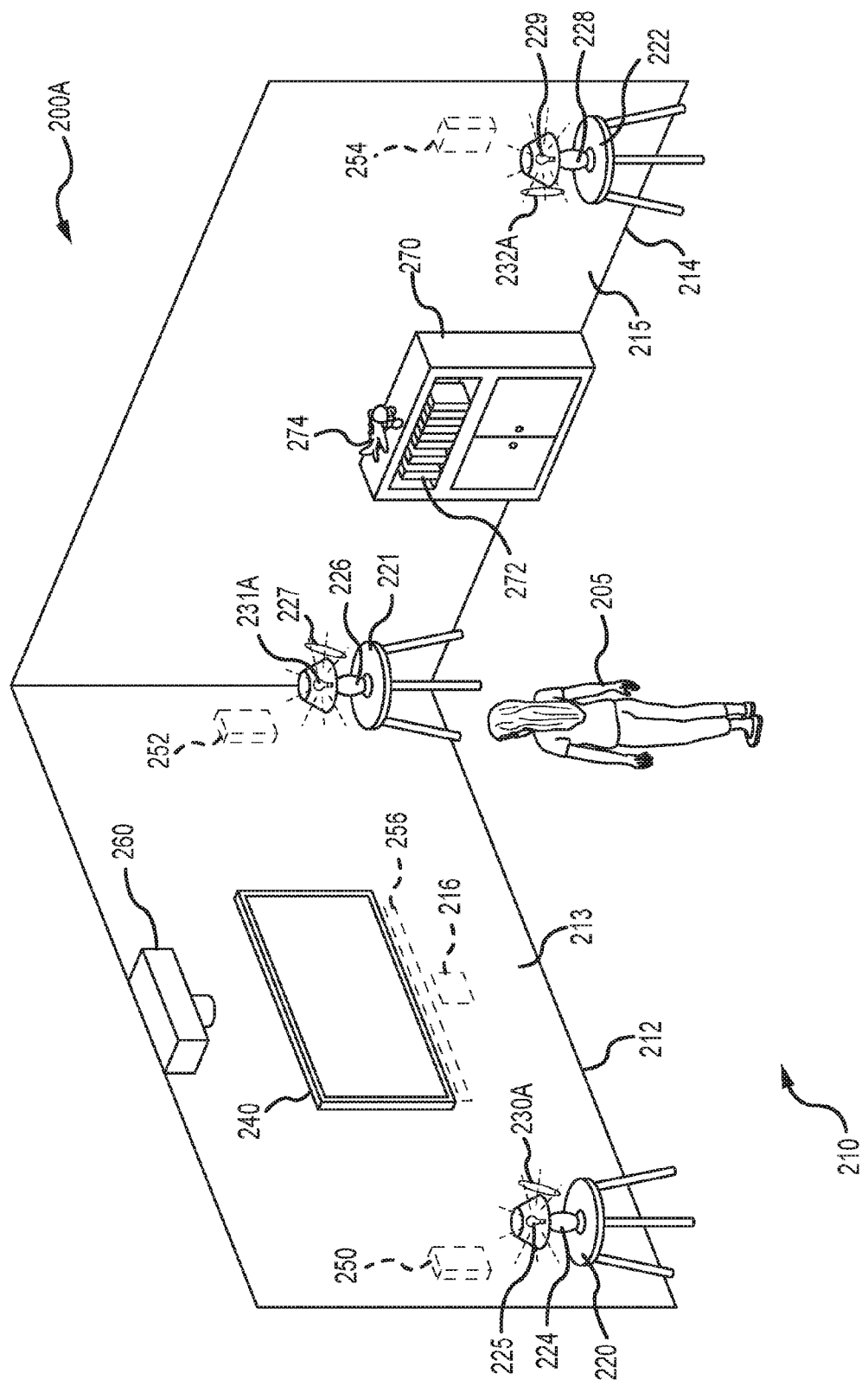
FIGS. 2A-2E illustrate an interactive entertainment system of the present description, such as a particular implementation of the system shown in FIG. 1, installed in an exemplary room and operated in various operating states to transform the room into an interactive show and/or game environment to allow people in the room to enjoy a multimedia presentation and/or to partake in an interactive game.

Beginning with FIG. 2A, a room 210 is illustrated in which an interactive in-room show and game system of the present description, such as a particular implementation of the system 100 shown in FIG. 1, is installed and operated in various operating states to transform the room 210 into a show or game environment to allow people in the room to enjoy a multimedia presentation (e.g., an interactive story, movie, game, or the like). FIG. 2A illustrates the in-room show and game system 200A in an initial or first operating state. The room 210 has an interior space defined, in part, by a number of walls with two side-by-side walls 212 and 214 shown for simplicity of illustration (with the understanding the room 210 also would have two or more walls, a ceiling, and other features and surfaces defining its interior space). A guest or game player 205 is shown to be in the room 210 and, in this example, to be standing in the center of the room 210 facing the display device 240. Facing the guest or game player 205 are the inner surfaces 213, 215 of the two sidewalls 212, 214. The room 210 may also include a number of furniture pieces such as tables 220, 221, and 222 and a bookshelf 270.

In this room 210, the interactive in-room show and game system 200A is provided to transform the room 210 with multimedia content that is selected or generated in an interactive manner. Particularly, the system 200A includes a sensor assembly 216 that may include one or more sensors as discussed with reference to FIG. 1 for sensing "user input" from the guest or game player 205, with the term "user input" meaning generally any parameter or characteristic pertaining to the guest or game player 205 including their presence in the room 210, their location in the room 210, their identity, their emotional state, their actions/motions, their interaction with surfaces and/or props/controllers in the room 210, their speech, and so on. In this initial state, the system 200A may process sensed "user input" from the guest or game player 205 that is obtained from a sensor of assembly 216 (e.g., a motion detect, a pressure sensor, a camera, or other sensor useful for sensing a presence of a person in the room 210) and passed to a controller as sensor data, and this may result in the system 200A determining the presence of the guest/game player 205 in the room 210 (and, in some cases, her identification such as with facial recognition, by reading an RFID chip in a badge, or the like). The controller of the system 200A may issue initial control signals to place the system's components in a default or first state associated with the presence of a person in the room 210.

For example, the system 200A includes a lighting assembly or system that can be controlled by a show/game controller (e.g., not shown but may take the form of the controller 120 in FIG. 1 or the like), and, in this simple but not limiting example, the lighting assembly includes a set of lamps 224, 226, and 228 (but typically may also include more lighting fixtures including the overhead lighting elements and so on). Each of the lamps 224, 226, and 228 includes a bulb or element 225 227, and 229 that can be controlled by the show/game controller (e.g., via wired or wireless control signals) to be on or off, to have a particular brightness, and to have a particular color. In the initial or first operating state shown in FIG. 2A, the light bulbs/elements 225, 227, and 229 are being used in a conventional manner to illuminate the room 210 such as with a relatively high brightness level and to provide white light as shown with dashed lines 230A, 231A, and 232A.

The show system 200A also includes a display device 240 such as a flat screen television or the like mounted the inner surface/side 213 of the wall 212. The display device 240 is also controllable/operable by the show/game controller to display show or game content (called display content in system 100 of FIG. 1) and also to be on or off, with the display device 240 shown to be off (or not displaying content) in the first operating state shown in FIG. 2A. In other words, the first operating state may be considered to be pre-show/game or prior to any show/game being initiated but after a guest/game player 205 is detected in the room 210, and the show controller may place all of its components in pre-show/game states (or allow their operations to be controlled by other devices/inputs in some cases).

The show system 200A further includes a sound or audio system that in FIG. 2A is shown to include a number of speakers 250, 252, 254, and 256 recessed in the walls 212, 214 to hide their presence from the viewer 205 (although this is not required to practice the system 210A). The speakers 250, 252, 254, and 256 are arranged to provide surround sound and/or to provide directional or source-based sound in various locations of the room 210, with the speaker 256 being used to provide sound associated with content provided by the display device/television 240. In the first operating state shown in FIG. 2A for the system 210A, the show controller is operating the audio system to provide no output/sound (or the speakers are "off").

The show system 200A includes a projector 260 that is also operable via wired or wireless signals from the show controller of the system 200A. The content to be projected (called "projector content" in FIG. 1) is mapped to the various surfaces/objects in the room 210, e.g., the surface/side 213 of wall 212 is mapped along with the location, size, and shape of the display device 240 such that content can be projected onto all the surfaces/areas 213 of wall 212 except the area associated with the display device/television 240 that may be blocked or blacked out (e.g., no or little light from the projector 260 may be directed onto the screen of the device 240). In the first operating state shown of system 200A in FIG. 2A, the projector is "off" or in a standby mode and not projecting light/content (or no content is provided from the show/game controller).

The show/game system 200A also includes a number of props/remote controllers 272, 274 that can be operated by the guest/viewer 205 to initiate new shows/games or parts of shows/games (e.g., to interact with the show/game controller and/or the room 210). These props/remote controllers 272, 274 may take nearly any form with a prop/remote controller 272 shown in the form of a book (or board game) and prop/remote controller 274 shown as a toy (e.g., an airplane).

These props 272, 274 are "off" in the first operating state of system 200A shown in FIG. 2A such that the shows/games or show/game content associated with or triggered by each is not being presented by the show/game controller via operation of the system 200A. When activated or turned on by the guest 205 (e.g., simply by opening or picking up the book 272, moving or operating an "on" switch on the plane/toy 274, with a sensor in the assembly 216 detecting selection (e.g., movement) of one of the props and/or particular interaction with it (e.g., movement of pieces of a board game, turning pages of a book, and the like), and so on), the two props 272, 274 may cause the show/game controller to initiate two different shows/games or two different sets of content (e.g., receive signals that identify which prop is "on" or activated or interacted with by the person 205, retrieve a file defining a show/game (such as file 142 in FIG. 1), and operate the components of the system 200A to provide a multimedia show or game presentation such as an interactive game or show associated with the book's (or board game's) content (e.g., read the book aloud over the audio system while providing video or still images with display device 240 and projector 260 with scenery/ characters from the book, a show/game suited to the toy (e.g., provide images similar to those seen by a pilot of an airplane on the wall surface 213 and display device 240), and so on).

Figure 2B:
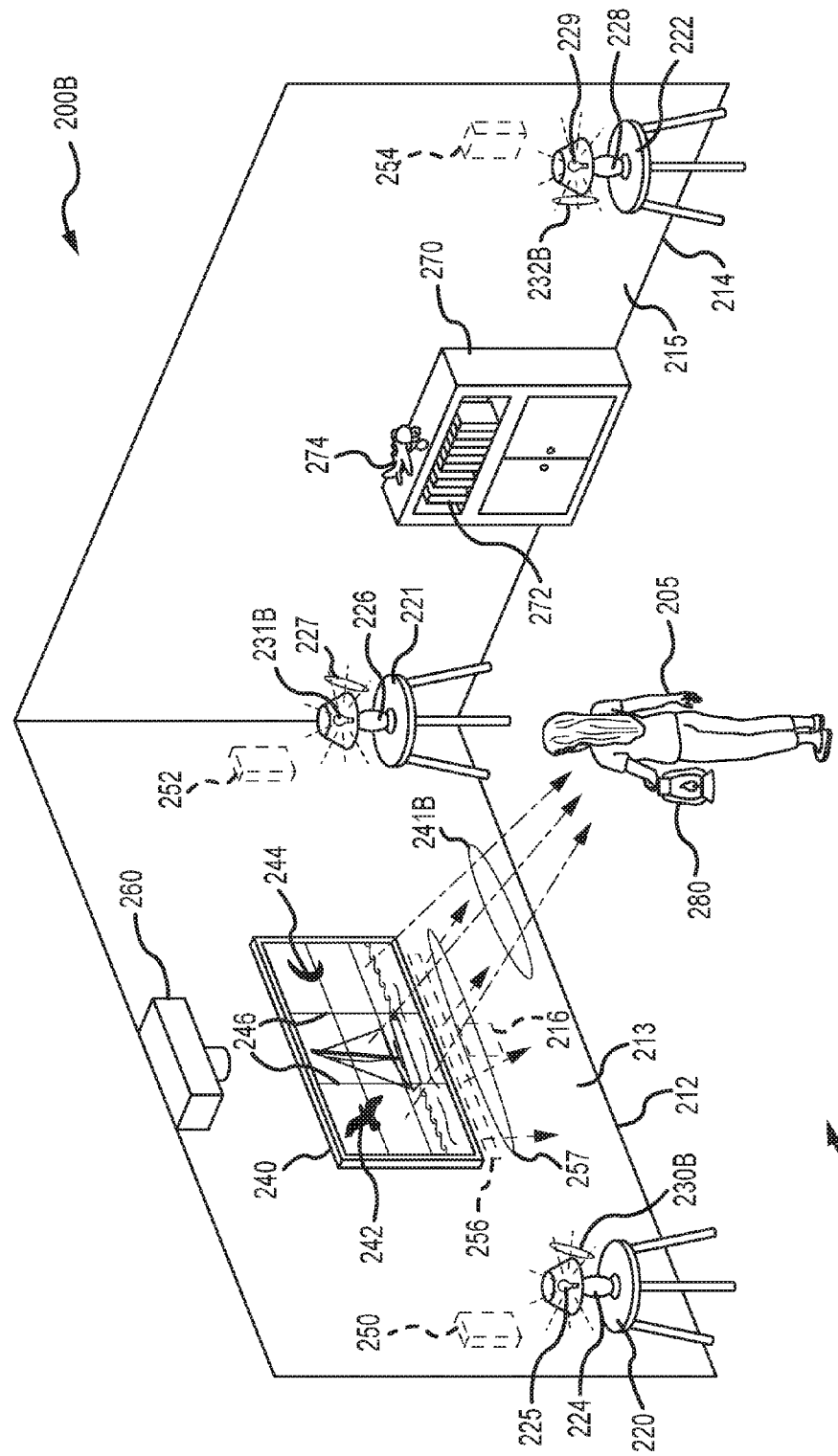

FIG. 2B illustrates the room 210 when the show and game system 200B is operating in a second operating state or mode. In this example, the guest/viewer 205 is initiating or playing an interactive game or show/story. The person 205 has selected a prop/game controller 280 such as one in the form of a lantern (as shown) or other game piece (e.g., a sword/weapon, a piece of athletic equipment, or the like), and the player 205 may turn on or activate the game controller/prop 280, which causes a signal to be transmitted to the show controller of the system 210B, and/or the sensor assembly 216 may use one or more of its sensors to sense movement of the game controller/prop 280, sense placing it in the player's hand or in a predefined location in the room 210, and so on and to identify the prop/controller 280. The show/game controller responds by determining the ID of the controller/prop 280 and retrieving a show/game file associated with this prop/remote controller 280 from memory/data storage. This show or game file defines the show or game's content and how and when each component in the show system 200B is be operated/controlled. In this example, the show or game file defines an "interactive show/story" or "interactive game" for transforming the room 210 into a beach or island (or other environment) associated with the particular game or show associated with the game controller/prop 280.

Particularly, as shown in FIG. 2B, the show/game controller acts to operate the lighting system in a second operating mode/state, and this may involve dimming the brightness and/or modifying color of each lighting element/bulb 225, 227, 229 (or even turning all or some of these bulbs 225, 227, 229 off) as shown with second output light 230B, 231B, and 232B. Concurrently or sequentially, the display device (e.g., television) 240 is operated by the show/game controller to display content to the guest/viewer 205 as shown with light 241B transmitted outward from its screen. In this example, the second operating mode or state involves the display device 240 presenting content 241B that begins to place the guest/viewer 205 into the setting of the interactive show/story or game (e.g., present screens that a game player would expect in a conventional video game on the television 240).

In this example, the story or game takes place on a beach or on an island, and the content 241B is chosen to transform the screen of the display device 240 into a view of the beach/view from a place on an island including a window frame/panes 246, and outdoor objects such as the sea with its waves, a ship sailing on the sea, a flying sea bird 242, and the moon 244. Also, the show/game controller operates the sound system to play or output as shown with arrows 257 a soundtrack or set of sounds from the speaker(s) 256 near or associated with the display device 240. In this way, the sounds appear to be coming from the window (which may be open), and these sounds may include sea/ocean noises, bird (or other wildlife sounds), wind/breeze sound effects, and/or may include sounds similar to those found on a beach or on an island (or in the game) and may include music, the background chatter and noises from "other game players" or "other game activity", and the like. In this second operating mode or state of system 200B, the show/game controller coordinates or synchronizes operation of the audio system, the lighting system, and the display device to create a multimedia presentation or effect such as a portion of interactive storytelling or gameplay.

Figure 2C:
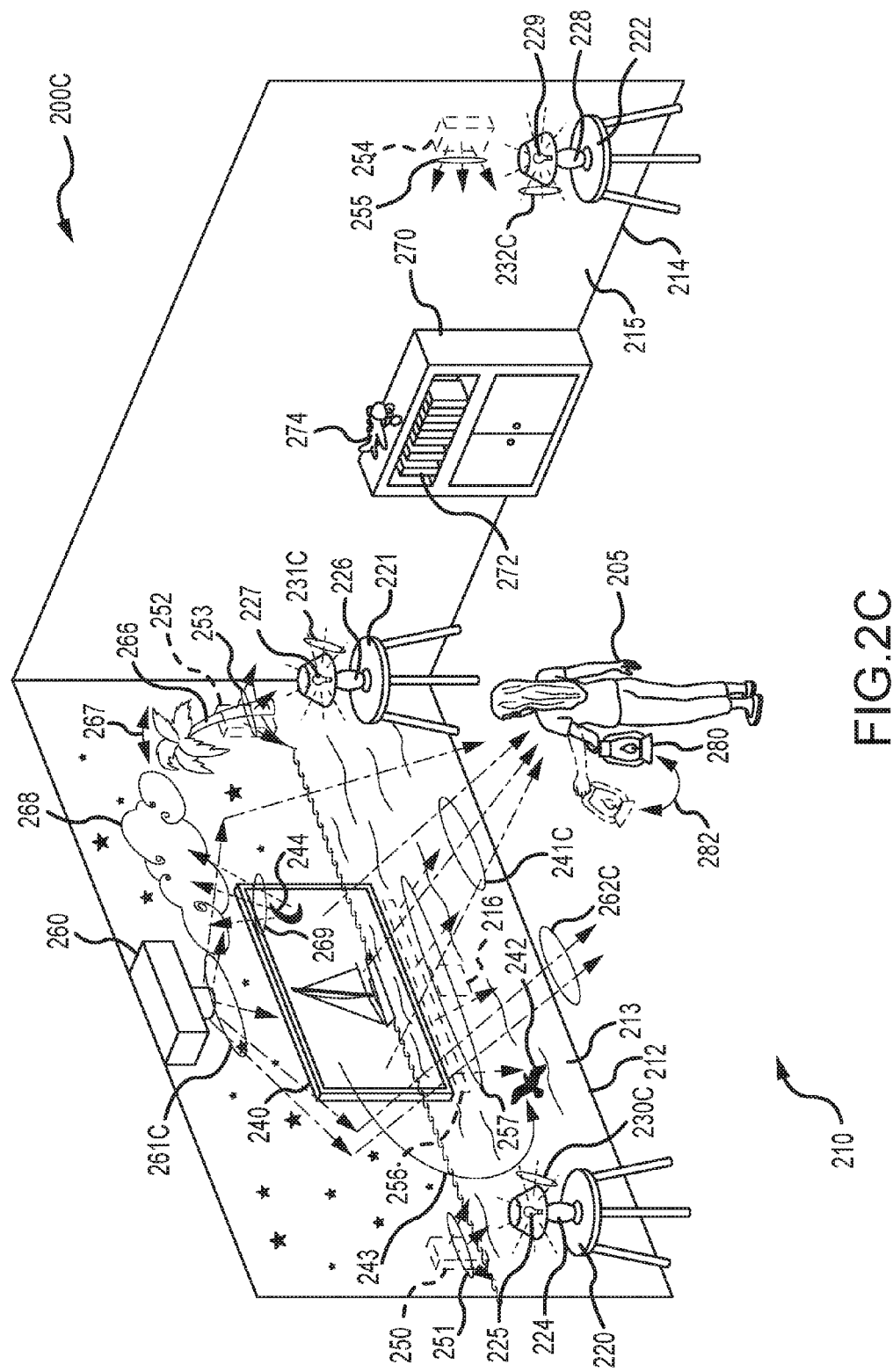

The show or game triggered by sensed positioning and/or moving of the prop/remote controller 280 includes additional content (e.g., later scenes of an interactive story or different levels of a game) that causes the room 210 to transform further such that the window provided by the display device 240 in the second operating state of FIG. 2B disappears as does the wall 213. In other words, the room is "moved" outside onto the beach or in the island jungle being simulated by operation of the show/game system 200C. Particularly, FIG. 2C shows the room 210 with the show system 200C operating in a third state or mode or at a different point in the timeline or in the level(s) defined by the show/game file retrieved in response to the sensing of movement 282 of the prop or game controller/element 280 and being "played back" or rendered in real time by the show/game controller of system 200C (e.g., with a game engine responding to user input 282 with the game controller/prop 280).

As shown, the display device 240 is now displaying differing content as shown with light 241C transmitted from the device's screen toward the guest/viewer or into room 210. This content does not include the window bars/frame elements 246 shown in FIG. 2B as the display device's content 241C is being blended with the content on wall surface 213. To this end, the controller acts to operate the projector 260 to project content/light 261C onto the wall surface 213 (except typically in areas associated with the monitor/display device 240). All the areas or surfaces 213 of wall 212 are mapped for projection by projector 260 (e.g., the content provided by the projector as shown at 261C is mapped to the wall surface(s) 213). For example, a palm tree 266 is shown to be projected onto the wall surface 213 to one side of the display device 240 and be growing from a sandy beach displayed below the display device 240. The wall 212, in effect, provides a projection surface or screen for the projector 260 as light 262C from its surface 213 is reflected/directed with the light 241C from the display device 240 to the guest/viewer 205 (or into room 210).

Further, the projected content/light 261C is chosen to match or extend the content 241C from the display device 240, e.g., the interactive game or show expands out from the display device 240 to the entire room 210 (or at least wall surface 213). In this example, the display device 240 may be hidden or appear to be the source of the imagery on the wall surface 213 by having the content 261C matched in location and composition with the content 241C from the display device 240. For example, the sea/waves shown with the display device 240 are extended out in the projected content 261C in locations mapped to the location of the display device 240 and even its content. Similarly, the moon 244 shown in the display device 240 is used to "light" nearby objects in the projected content 261C, e.g., a cloud 268 in the projected sky above the display device 240 on an area of the wall surface 213 as shown with arrows 269. Similarly, the sea bird 242 is shown by arrow 243 to appear to fly out of the display device 240 onto areas of the wall surface 213 (e.g., game or story characters and objects can move into the room 210 to interact with the player/viewer 205).

The multimedia interactive show or game provided in the third operating state (or at a third time on the show's timeline or level(s)) also involves the show/game controller modifying operations of the programmable/controllable lights 225, 227, 229 to further the illusion that the room 210 is actually an outside space on an island or beach in the evening/night (or other time of day). This may again involve modifying the brightness and/or color of the output light as shown with arrows 230C, 231C, 232C. In some cases, the lamps 224, 226, 228 are designed to further some show or game effect such as to appear to be oil lamps, torches, candles, and so on that are "lit" by the show controller turning on each bulb/lighting element 225, 227, 229 and controlling their brightness and/or color to suit the particular effect.

The show/game controller in the operating state of system 200C in FIG. 2C also modifies operations of the audio/sound system such as by playing audio content (a soundtrack) from each of the additional surround sound speakers 250, 252, 254 with this directional/location-based output sound shown with arrows 251, 253, 255 and being perceived in the room 210 by the guest or game player 205. For example, the bird 242 in the projected content may move 243 (the projected content 261 includes video or animation) from a portion of the wall surface 213 near the speaker 251 to a portion of the wall surface 213 near the speaker 253, and sounds associated with the bird 242 can be played first from the speaker 251 and then from the speaker 253 to enhance the show or game experience by providing source-based or location-based surround sound. Similarly, sound effects or audio output 253 associated with the movements 267 of the palm tree 266 may be provided from the speaker 252 as this is the nearest or most proximate speaker in the audio/sound system in the show system 200C. The experience can be terminated by removal of the prop/remote controller 280 that can be sensed by a sensor of the sensor assembly 216 and/or by operating a switch turning the prop/remote controller "off" (or signaling the show controller with prop 280 to turn the present show off or to end this show).

By selective and well synchronized control of the various components of a show/game system and use of the room as a blank slate to show differing content, the range of shows that can be presented in the room are nearly limitless or only limited by the imagination of the users of such a show system. Hence, the example provided in FIGS. 2B and 2C is only one useful (but simplified) example (which of course can continue along the show timeline or game level(s)) with the show/game system being operated in many differing states as differing content is displayed and output with the show and game system.

Figure 2D:
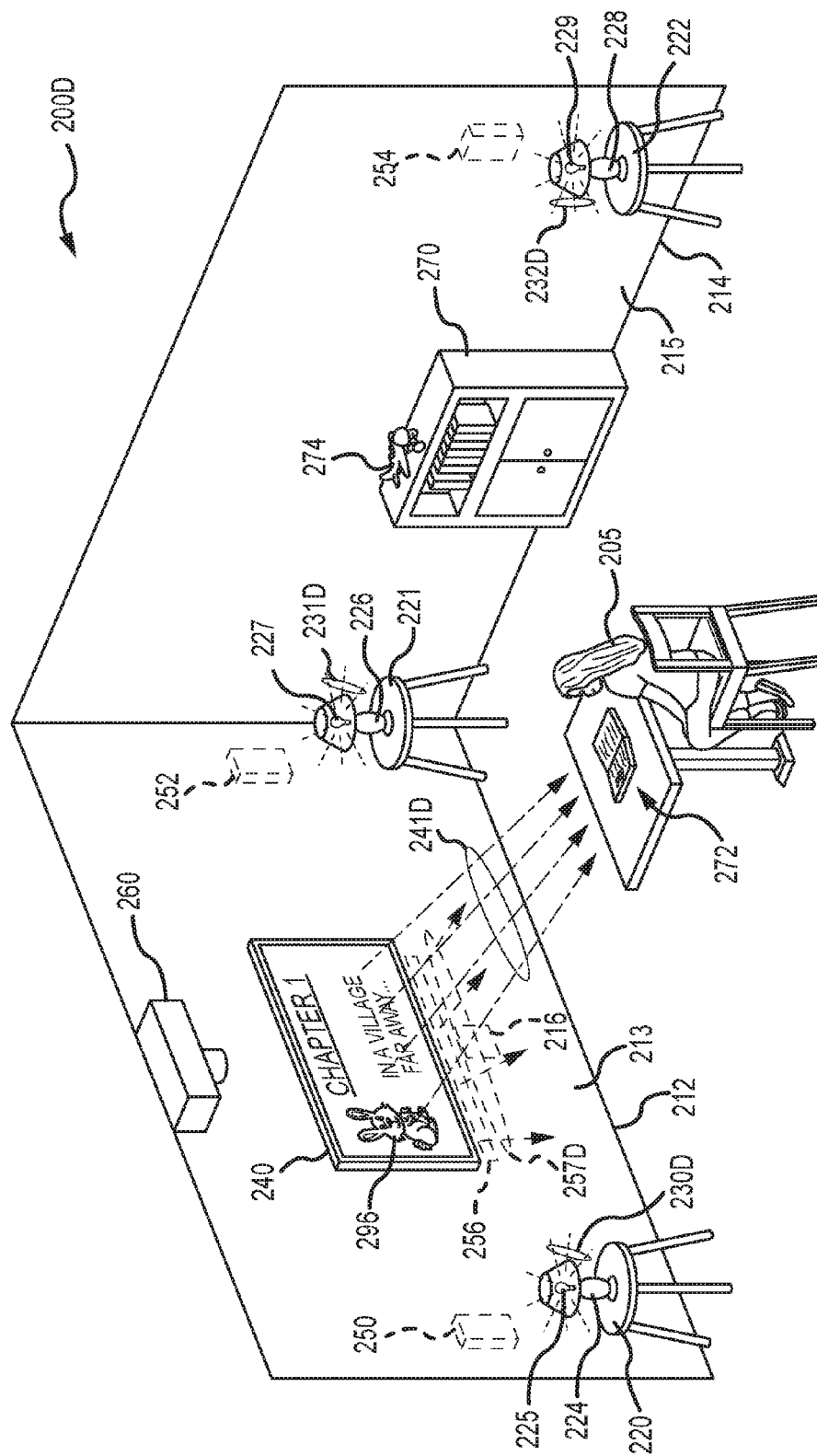

With these varying interactive shows or game experiences in mind, it may be useful to describe another show that can be provided by a show and game system in room 210. FIG. 2D illustrates the room 210 when instead of the prop/controller 280 movement and positioning by the guest 205 being sensed, the guest 205 has retrieved a book or board game 272 from the bookshelf 270 and opened it. Either picking it up or opening it (or flipping a switch) may be used to cause a show activation signal to be sent to the show/game controller or a sensor in the sensor assembly 216 may sense the book/board game 272, which responds by identifying the book or board game 272 by processing the sensor data/signal, retrieving a show file defining a show/game or a set of show/game content associated with the book or board game 272, and operating the show system to provide an interactive show or game experience in the room 210 suited to the book or board game 272.

For example, FIG. 2D shows that the show/game controller is operating the display device 240 to display content 241D on its screen associated with the book or board game 272. The interactive show or game experience may be a unique storytelling or immersive reading experience or playing a board game, and the content 241D may include displaying pages of the book 272 (as shown) or information or content associated with a board game. The soundtrack/audio content file may be provided, in part, from speaker 256 near the display device 240 and include a narrator's voice as they read the displayed pages or tell the story or provide instructions or tips for playing a board game. In addition to the use of the audio system and the display device 240, the show/game system 200D in this operating state may act to control operations of the lighting elements 225, 227, 229 to output light 230D, 231D, 232D of a desired brightness and color.

Figure 2E:
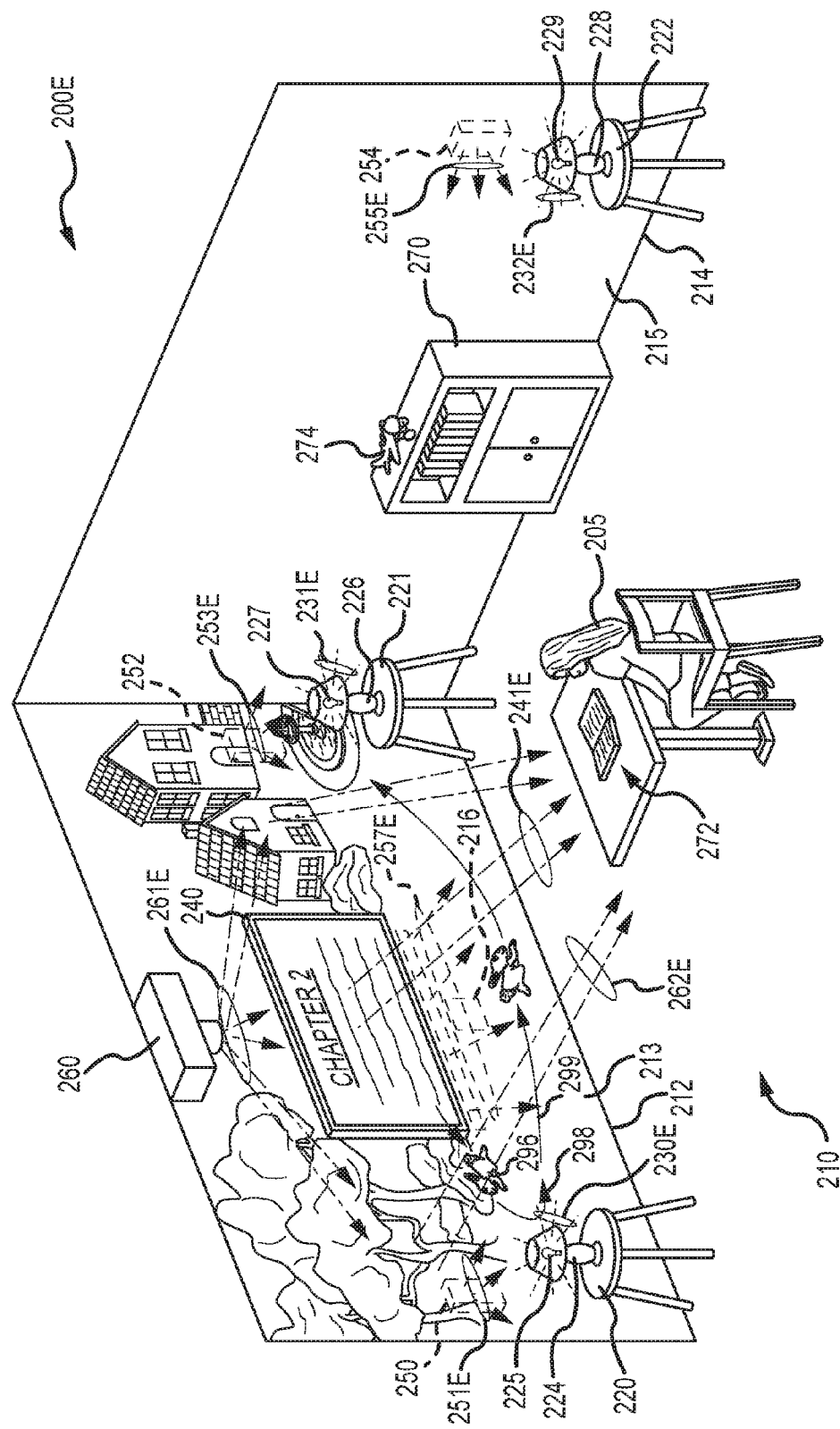

FIG. 2E illustrates the room 210 later in this book-based (or prop-based) show or board game playing experience when the show/game controller operates the show/game system 200E in a different or second operating state (or based on a different set of show/game content). This second operating state is entered into in response to a sensor of the sensing assembly 216 sensing interaction of the player 205 with the book/board game 272 (e.g., turning a page, moving a game piece on a board, and so on). As shown, the display device 240 is operating to display different content 241E such as a later page/chapter of the book 272 (or new tips or information for the board game based upon a last sensed move and current status of board pieces), and, concurrently, the speaker 256 near the display device 240 is used to output different audio output 257E, e.g., the narrator reading the currently displayed book pages, narrator/character of board game providing encouragement or tips on gameplay, or the like.

Also, in a time synchronized manner, the show/game controller operates the projector 260 to project light 261E based on content associated with the book/board game 272 and interaction of player 205 with book/board game 272 sensed by the sensor assembly 216 and processed by the show/game controller. The projected content is perceived by the guest 205 with the displayed content 241E as shown with arrows 262E. The projected content 261E is mapped in location to the surface 213 of the wall 212 (and location of the display device 240 and other parts of the show/game system 200E including the lamps 224, 226, 228). In this manner, the projected content 262E can be used to transform the room 210 to match the subject/content of the book/board game 272. For example, the village or other setting described in the book 272 and displayed content 241E can be provided in still and video images in the projected content 261E. Further, a character 296 of the book 272 previously only shown as part of the displayed content (see FIG. 2D) can leap off the "page" and move about the wall surface 213.

The lighting assembly can also be controlled based on the projected content 261E such as to cause a bulb/lighting element 225 or 227 to modify its operations (e.g., become brighter or dimmer or change color or turn on or off) when the character 296 (or other aspect of the projected content 261E) runs by or into the lamp 224 or 226. While the projector 260 may not project on wall surface 215 of adjacent wall 214, show or game effects with show/game system components spaced apart from the surface 213 can be provided in a manner that is time synchronized with the projected and/or displayed content to further provide unique show features.

For example, the story being told may involve changing weather such as lightening, and the bulb/lighting element 229 may be flashed on and off to simulate lightening (provide light output 232E) in the room 210 and/or the speaker 254 may be used by the show controller to output sound effects or a part of the audio track or soundtrack as shown at 255E used to simulate thunder. As another show or game effect, the projected character 296 could run off the surface 213 and "disappear" (or not be projected or displayed anymore, but, after an appropriate delay, the speaker may play a crash or other noise from the remote/distal speaker 254 as shown at 255E and change operation of the light 229 to provide output light 232E (the noise could cause the light to go off or on, to change color, to change brightness, and so on)). Further, the show controller can modify the operations of the audio system to enhance the show such as by playing portions of the soundtrack or audio file on the surround speakers 250, 252, 254 as shown at 251E, 253E, 255E to suit the ongoing storyline as well as displayed and projected content 241E and 261E.

Figure 3:
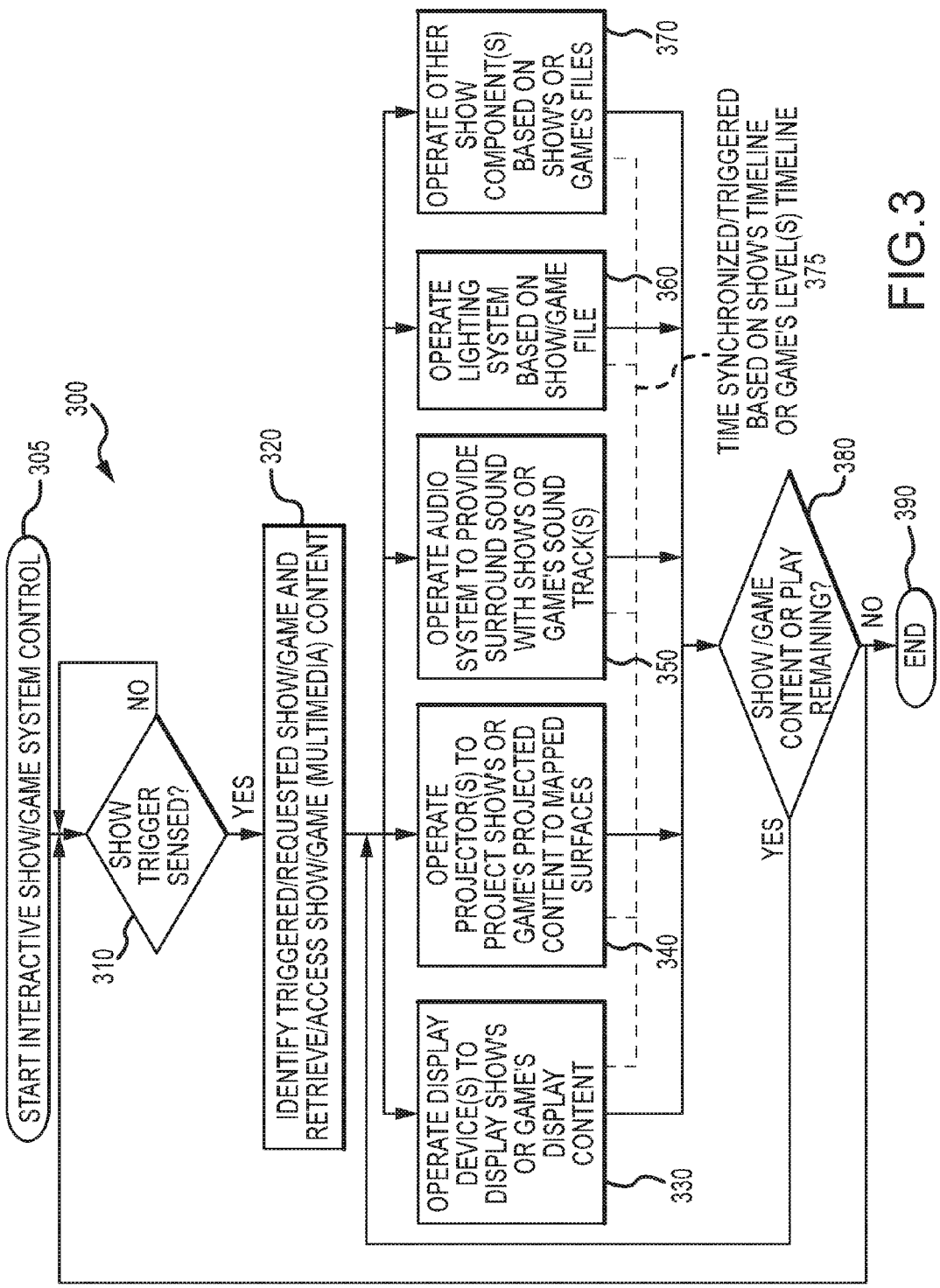
FIG. 3 is a flow diagram of a method for operating and/or controlling a show and game system of the present description such as via operations of the controller of the system of FIG. 1.

FIG. 3 is a flow diagram of a method 300 for operating and/or controlling a show/game system of the present description such as via operations of the show/game controller 120 of the system 100 of FIG. 1. The method 300 begins at 305 such as with preparing an in-room show/game system for use in a particular room (e.g., any space with walls or other surfaces defining a space for providing an interactive show or game experience as described herein). This may involve selecting a display device(s) and positioning the display device within the room such as by hanging a flat screen or similar television on an interior surface of a wall defining the room, by positioning a display monitor on a stand in the room and so on.

The startup 305 may also include choosing a projector for projecting video onto one or more walls or other surfaces of the room that act as projection screens during operation of the show/game system. A location for the projector is chosen relative to the wall or other projection surface, and the wall's surface or other projection surface is mapped (e.g., projection mapping is used to provide video or still images on one or more of the room's surfaces with this projector) from this particular projector location and orientation (where its projection lens(es) are facing and at what projection angle). The startup step 305 may further include providing programmable lights (or a lighting system with one to many selectively controllable bulbs or lighting elements) at various locations in the room to achieve desired lighting effects to suit one or more shows or games planned for the room. With this in mind, the startup 305 typically also includes choosing and designing one or more shows or games for providing an interactive experience in the room, and these shows or games may dictate the lighting system design, the display device, and the location and number of the projectors.

Further, a show/game controller (e.g., a computing device) is provided in or near the room that is adapted to run a show/game control computer program and to communicate in a wired or wireless manner with the various show/game components to provide control signals and cause the components to play back show or game content, to render (such as with a game engine) show or game content in response to sensed user input in the room, and/or to function in a manner defined by the show or game file/program. For example, a particular lighting element may be turned on a predefined time in a show timeline or at a time on a particular level of a game that coincides with the projector projecting particular content/light onto a surface near that lighting element and so on. The show/game system startup 305 also may include providing an audio system in (or near) the room's interior space, and the audio system is controlled via signals from the show/game controller typically to provide surround sound effects during a show or game such as by playing differing portions of a soundtrack from speakers positioned in a number of locations about a room (e.g., on all sides of the center of the room so that a person in the room perceives sounds in the show as having two or more sources at differing locations in the room).

The show/game system may include additional show/game components (such as a fan, an electrical-based show prop, a mechanical-based prop, a room thermostat controlling heating/cooling components, and so on), and each of these are positioned in the room and configured for communications with the show/game controller in step 305 (e.g., to receive control signals triggering these components to operate at particular times in the show's timeline or in response to processing sensor data used to detect user input (which, again, may be nearly any predefined characteristic or parameter of a player/person in the room that can be sensed by one or more sensors of a sensor assembly). In step 305, one or more props, other remote control devices (or a client device providing a user with a show control GUI or the like), interactive elements (such as game controllers that may be used in combination with a motion sensing panel or the like as found in many interactive video game systems), and the like may be chosen for use in the room. Each of these will be configured to initiate one or more of the shows created for the particular room.

Step 305 may also include the show/game controller operating to place some or all of these show or game components into a standby or "off" operating state or mode. For example, the projector and display device may be turned "off" or at least not be projecting or displaying any content, the audio system may be off or not outputting any sound, and the lighting system may be "off" or placed in a non-show mode where other controllers besides the show/game controller may determine their operations (likewise, the display device may take the form of a conventional television, and it may be placed in a pre-show or standby mode/state of operation allowing a conventional remote control device to affect its operations until control is assumed by the show/game controller).

The method 300 continues at 310 with the show/game controller being in a standby operating mode but with its sensor assembly (with its one or more sensors) operating to sense or detect user input in the room (e.g., motion by person, identity of the person, movement of an interactive prop/controller in a particular manner, a person speaking in the room, and so on) and determining whether a show triggering signal (or remote controller input signal) has been sensed by sensor assembly (e.g., by processing sensor data). If not, the method 300 continues at 310. If a signal has been received, the method 300 continues at 320 with the show/game controller processing the sensor data to determine when a new show/game has been triggered by the sensed user input or when a next set of content for an ongoing show/game has been triggered (or a particular modification to the present show/game should be initiated based on sensor data). Then, the show/game controller in step 320 acts to retrieve and/or access the show file or the game file/program identified by the sensed trigger signal, and the show/game file defines the content for the show or game (or this content is rendered in response to the sensed user input and/or how to control each of the show/game components over the show's timeline (or runtime) or the game's play timeline/level(s)).

The method 300 continues with the show/game controller acting to operate each of the show or game components (or a subset defined by the show or game file) in the show/game system in a time synchronized manner (as shown with dashed line 375 in FIG. 3) to provide a multimedia show or gaming experience in the room. The operations of the show or game components is time synchronized along the show's timeline or game's timeline/level, and this may involve concurrent operations and/or sequential operations over time (see, for example, the shows/games described above in reference to FIGS. 2A-2E). Hence, FIG. 3 illustrates that the method 300 involves the show/game controller (directly or via intermediate control devices) generating and transmitting control signals for: (a) operating the display device (e.g., a television or the like) to display the show's or game's display content defined for the length of the show's or game's timeline; (b) operating the projector to project the show's or game's projected content defined by the show/game file for the length of the show's or game's timeline; (c) operating the audio system to play the soundtrack(s) defined by the show or game file for the length of the show's or game's timeline; (d) operating the light system to illuminate or light the room's space and surfaces based on lighting effects defined for triggering along the show's or game's timeline; and (e) operating the other show or game components to perform actions/functions defined by the show file at particular points in time along the show's or game's timeline.

The method 300 continues at 380 with the show/game controller determining whether the show or game file defines further show or game content (or whether the end of the show or game or the end of the show's timeline or game player's life has been reached). If more show or game content remains, steps 330, 340, 350, 360, and 370 are continued with synchronized control of the various show and game system components to continue the presently triggered/selected show or game in the room. If the show or game is ended, the method 300 may end at 390 (e.g., shut down the show and game system) or at 310 with placing the show and game system in standby mode and awaiting a next show-triggering or game-triggering signal to be received or sensed by the sensor assembly of the interactive in-room show and game system.

Figure 4:
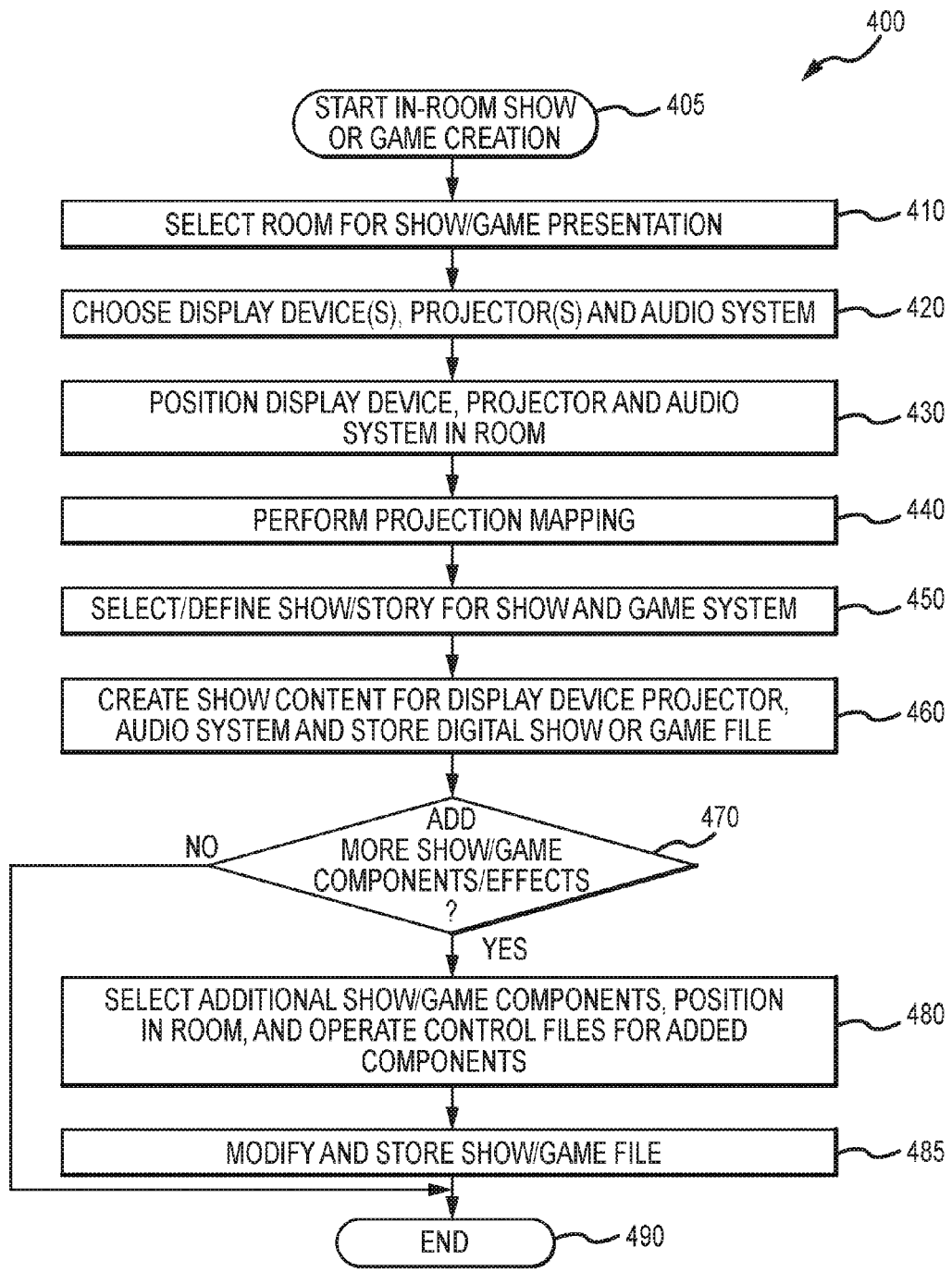
FIG. 4 is a flow diagram of a method of generating a show or game file defining content and controls for an interactive in-room show and game system of the present description.

FIG. 4 illustrates a show or game file generation method 400 for use in creating content and control instructions for a show or game to be presented in a room by operation of an in-room show system of the present description. The method 400 starts at 405 such as with identifying potential components for inclusion in a show system to provide content and/or special effects. Step 405 may also include generating/writing a show control application or game program and loading this software on a show/game controller along with a sensor data processing module for processing sensor data collected by a set of sensors placed in a room to sensor user input (or user interaction).

The method 400 continues at 410 with selecting a room (e.g., nearly any space where it is desirable to provide a multimedia show such as an activity room, a game room, an event room/space, a residential media room, and the like) that is to be transformed into an entertainment space with an interactive in-room show and game system. Then, the method 400 continues with selecting show/game system components such as a display device (e.g., a television), a projector (e.g., a video projector such as a microprojector), and an audio system (e.g., one or more speakers and audio playback equipment). Note, step 460 may be performed prior to step 420 as the particular show/game that is going to be presented may drive the show/game components to be included in the show and game system. The method 400 continues at 430 with choosing locations for these show/game components and then mounting or otherwise positioning the display device, the projector, and audio system (speakers) in their assigned/chosen locations in the room (or nearby to the room's interior space such as in/on the ceiling or walls).

The method 400 continues at 440 with performing projection mapping for the positioned projector to provide a 3D mapping of the surfaces in the room upon which the projector will project its content (e.g., a wall defining the interior space of the room and upon which the display device may be mounted). The method continues at 450 with selecting or defining the interactive show/story or game to be provided by the show system. Then, at 460, show/game content and component controls are created for the display device, the projector, and the audio system, and this content often will also be generated at least partially in real time in response to sensed user input from a viewer/game player in the room during system operations (e.g., game content generated in response to sensing user input in the room). Note, the projection mapping may include the display device or other features in the room that it may not be desirable to project content upon, and the projector content may include areas/surfaces that are mapped but that are blacked out/blocked out so that no (or little) light (content) is projected upon these surfaces.

Also, the operation of the various show and game system components is synchronized, and this may be achieved by a show or game file having a single timeline for providing content/operation show/game components and control signals are defined relative to this timeline (e.g., to allow a character/object displayed at a first time on the display device to be projected by the projector at a second time (and no longer on the display device) so as to appear to move off the display device onto a projection surface in the room (e.g., a wall surface)). The show/game file is then stored in memory/data storage (and updated on an ongoing based with newly rendered multimedia content in response to processing of sensor data from the sensor assembly by the show/game controller).

The method 400 then continues at 470 with a determination of whether additional show/game components are to be included in the show and game system to generate more content and/or provide additional effects. For example, the show or game may be enhanced by providing lighting or light-based effects, and the show and game system may include a lighting system with one-to-many programmable light bulbs or lighting elements. If not, the method 400 ends at 490.

If more components are to be added, the method 400 continues at 480 with selecting additional show/game components (e.g., lighting elements, show or game props that can be activated to come alive or provide some show-based effect in the room, a fan to selectively provide "wind", a HVAC controller for changing operation of the room's HVAC system to change the temperature in the room, and so on) to achieve the desired effects and/or provide the additional show/game content. Step 480 also includes positioning these components in the room and modifying the show or game file to include control instruction sets for each of these new components tied or linked to the show timeline to synchronize their operations by the show/game controller with the other show and game system components. The show or game file is modified to include these control instruction sets, and the show file is stored in memory/data storage for later retrieval (or access) by the show controller to present a show in the room via operation of the show system using the show file. The method 400 may end at 490 (or continue at 410 with generating another show file for the room and its in-room show and game system).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, the types of sensors that may be included in the sensor assembly, the type of data collected, and the processing performed on this collected data may vary widely to practice the systems (such as system 100 of FIG. 1). These sensors may include voice recognition sensors and software. Such sensors could be used during reading of a book to a child, and the sensor assembly can be used to allow tracking of where the person reading the book aloud is in the written story and to change the show/display to keep up with their pace. Such sensors could also be used to hear commands such as to shut off the lights or turn on an appliance or to activate a particular portion of a display.

The sensor assembly may also include optical sensors. Optical systems utilize data captured from image sensors to triangulate the 3D position of a subject between two or more cameras calibrated to provide overlapping projections. Data acquisition is traditionally implemented using special markers attached to an actor; however, more recent systems are able to generate accurate data by tracking surface features identified dynamically for each particular subject. Tracking a large number of performers or expanding the capture area is accomplished by the addition of more cameras. These systems produce data with 3 degrees of freedom for each marker, and rotational information is inferred from the relative orientation of three or more markers; for instance shoulder, elbow and wrist markers providing the angle of the elbow. Newer hybrid systems are combining inertial sensors with optical sensors to reduce occlusion, increase the number of users and improve the ability to track without having to manually clean up data.

The optical systems may use passive markers, active markers, time-modulated active markers, and/or semi-passive imperceptible markers or may be markerless. Passive optical systems use markers coated with a retroreflective material to reflect light that is generated near the cameras lens. The camera's threshold can be adjusted so only the bright reflective markers will be sampled, ignoring skin and fabric. The centroid of the marker is estimated as a position within the two-dimensional image that is captured. The grayscale value of each pixel can be used to provide sub-pixel accuracy by finding the centroid of the Gaussian. An object with markers attached at known positions is used to calibrate the cameras and obtain their positions and the lens distortion of each camera is measured. If two calibrated cameras see a marker, a three-dimensional fix can be obtained. Typically, a system will include 2 to 48 or more cameras. Systems of over three hundred cameras exist to try to reduce marker swap. Extra cameras are useful for full coverage around the capture subject and multiple subjects. Vendors have constraint software to reduce the problem of marker swapping since all passive markers appear identical. Unlike active marker systems and magnetic systems, passive systems do not require the user to wear wires or electronic equipment. Instead, hundreds of rubber balls are attached with reflective tape, which needs to be replaced periodically. The markers are usually attached directly to the skin (as in biomechanics), or they are velcroed to a performer wearing a full body spandex/lycra suit designed specifically for motion capture. This type of system can capture large numbers of markers at frame rates usually around 120 to 160 fps although by lowering the resolution and tracking a smaller region of interest they can track as high as 10000 fps.

Active optical systems triangulate positions by illuminating one LED at a time very quickly or multiple LEDs with software to identify them by their relative positions, somewhat akin to celestial navigation. Rather than reflecting light back that is generated externally, the markers themselves are powered to emit their own light. Since inverse square law provides one fourth the power at two times the distance, this can increase the distances and volume for capture. This also enables high signal-to-noise ratio, resulting in very low marker jitter and a resulting high measurement resolution (often down to 0.1 mm within the calibrated volume). The power to each marker can be provided sequentially in phase with the capture system providing a unique identification of each marker for a given capture frame at a cost to the resultant frame rate. The ability to identify each marker in this manner is useful in realtime applications. The alternative method of identifying markers is to do it algorithmically requiring extra processing of the data. There are also possibilities to find the position by using colored LED-Markers. In these systems, each color is assigned to a specific point of the body.

Active marker systems can further be refined by strobing one marker on at a time or tracking multiple markers over time and modulating the amplitude or pulse width to provide marker ID. Twelve megapixel spatial resolution modulated systems show more subtle movements than four megapixel optical systems by having both higher spatial and temporal resolution. Directors can see the actor's performance in real time, and watch the results on the motion capture driven CG character. The unique marker IDs reduce the turnaround, by eliminating marker swapping and providing much cleaner data than other technologies. LEDs with onboard processing and a radio synchronization allow motion capture outdoors in direct sunlight, while capturing at 120 to 960 frames per second due to a high speed electronic shutter. Computer processing of modulated IDs allows less hand cleanup or filtered results for lower operational costs. This higher accuracy and resolution requires more processing than passive technologies, but the additional processing is done at the camera to improve resolution via a subpixel or centroid processing, providing both high resolution and high speed.

With regard to semi-passive imperceptible markers, one can reverse the traditional approach based on high speed cameras. Systems sometimes use inexpensive multi-LED high speed projectors. Then, specially built multi-LED IR projectors optically encode the space. Instead of retroreflective or active light emitting diode (LED) markers, the system uses photosensitive marker tags to decode the optical signals. By attaching tags with photo sensors to scene points, the tags can compute not only their own locations of each point, but also their own orientation, incident illumination, and reflectance. These tracking tags work in natural lighting conditions and can be imperceptibly embedded in attire or other objects. The system supports an unlimited number of tags in a scene, with each tag uniquely identified to eliminate marker reacquisition issues. Since the system eliminates a high speed camera and the corresponding high-speed image stream, it requires significantly lower data bandwidth. The tags also provide incident illumination data which can be used to match scene lighting when inserting synthetic elements.

With regard to markerless systems, emerging techniques and research in computer vision are leading to the rapid development of the markerless approach to motion capture. Markerless systems do not require subjects to wear special equipment for tracking. Special computer algorithms are designed to allow the system to analyze multiple streams of optical input and identify human forms, breaking them down into constituent parts for tracking. For example, a technique called Universal Capture or the like may be used that utilizes 7 camera setup and the tracking the optical flow of all pixels over all the 2-D planes of the cameras for motion, gesture and facial expression capture leading to photorealistic results.

Traditionally markerless optical motion tracking is used to keep track on various objects. High resolution images of the target being tracked can provide more information than just motion data. An optical tracking system typically includes three subsystems: the optical imaging system, the mechanical tracking platform and the tracking computer. The optical imaging system is responsible for converting the light from the target area into digital image that the tracking computer can process. Depending on the design of the optical tracking system, the optical imaging system can vary from as simple as a standard digital camera to as specialized as an astronomical telescope on the top of a mountain. The specification of the optical imaging system determines the upper-limit of the effective range of the tracking system. The mechanical tracking platform holds the optical imaging system and is responsible for manipulating the optical imaging system in such a way that it always points to the target being tracked. The dynamics of the mechanical tracking platform combined with the optical imaging system determines the tracking system's ability to keep the lock on a target that changes speed rapidly.

The tracking computer is responsible for capturing the images from the optical imaging system, analyzing the image to extract target position and controlling the mechanical tracking platform to follow the target. There are several challenges. First, the tracking computer has to be able to capture the image at a relatively high frame rate. This posts a requirement on the bandwidth of the image capturing hardware. The second challenge is that the image processing software has to be able to extract the target image from its background and calculate its position. Several textbook image processing algorithms are designed for this task. This problem can be simplified if the tracking system can expect certain characteristics that is common in all the targets it will track. The next problem down the line is to control the tracking platform to follow the target. This is a typical control system design problem rather than a challenge, which involves modeling the system dynamics and designing controllers to control it. This will however become a challenge if the tracking platform the system has to work with is not designed for real-time. The software that runs such systems are also customized for the corresponding hardware components.

The sensor assembly could also include non-optical sensors/systems to collect the sensor data. For example, inertial motion capture technology is used in some embodiments and is based on miniature inertial sensors, biomechanical models, and sensor fusion algorithms. The motion data of the inertial sensors (inertial guidance system) is often transmitted wirelessly to a computer, where the motion is recorded or viewed. Most inertial systems use inertial measurement units (IMUs) containing a combination of gyroscope, magnetometer, and accelerometer, to measure rotational rates. These rotations are translated to a skeleton in the software. Much like optical markers, the more IMU sensors the more natural the data. No external cameras, emitters or markers are needed for relative motions, although they are useful to give the absolute position of the user if desired. Inertial motion capture systems capture the full six degrees of freedom body motion of a human in real-time and can give limited direction information if they include a magnetic bearing sensor, although these are much lower resolution and susceptible to electromagnetic noise. They can accurately measure the direction to the ground to within a degree. The popularity of inertial systems is rising amongst independent game developers, mainly because of the quick and easy set up resulting in a fast pipeline.

Mechanical motion capture systems can also be used and directly track body joint angles and are often referred to as exoskeleton motion capture systems, due to the way the sensors are attached to the body. A performer (or person in a room 110 in system 100) attaches the skeletal-like structure to their body and as they move so do the articulated mechanical parts, measuring the performer's relative motion. Mechanical motion capture systems are real-time, relatively low-cost, free-of-occlusion, and wireless (untethered) systems that have unlimited capture volume. Typically, they are rigid structures of jointed, straight metal or plastic rods linked together with potentiometers that articulate at the joints of the body. Some suits provide limited force feedback or haptic input.

In some sensor assemblies, magnetic systems are used and calculate position and orientation by the relative magnetic flux of three orthogonal coils on both the transmitter and each receiver. The relative intensity of the voltage or current of the three coils allows these systems to calculate both range and orientation by meticulously mapping the tracking volume. The sensor output is 6 DOF, which provides useful results obtained with two-thirds the number of markers required in optical systems; one on upper arm and one on lower arm for elbow position and angle. With magnetic systems, it is possible to monitor the results of a motion capture session in real time. The capture volumes for magnetic systems are dramatically smaller than they are for optical systems.

The sensor assembly may also rely on or include facial motion capture. Most traditional motion capture hardware vendors provide for some type of low resolution facial capture utilizing anywhere from 32 to 300 markers with either an active or passive marker system. High fidelity facial motion capture, also known as performance capture, is the next generation of fidelity and is utilized to record the more complex movements in a human face in order to capture higher degrees of emotion. Facial capture is currently arranging itself in several distinct camps, including traditional motion capture data, blend shaped based solutions, capturing the actual topology of an actor's face, and proprietary systems. The two main techniques are stationary systems with an array of cameras capturing the facial expressions from multiple angles and using software such as the stereo mesh solver from OpenCV to create a 3D surface mesh, or to use light arrays as well to calculate the surface normals from the variance in brightness as the light source, camera position or both are changed. These techniques tend to be only limited in feature resolution by the camera resolution, apparent object size and number of cameras. If the user's face is 50 percent of the working area of the camera and a camera has megapixel resolution, then sub millimeter facial motions can be detected by comparing frames. Recent work is focusing on increasing the frame rates and doing optical flow to allow the motions to be retargeted to other computer generated faces, rather than just making a 3D Mesh of the actor and their expressions.

A sensor assembly may also include sensors and software to provide RF positioning for processing by the display system. RF (radio frequency) positioning systems are becoming more viable as higher frequency RF devices allow greater precision than older RF technologies such as traditional radar. The speed of light is 30 centimeters per nanosecond (billionth of a second), so a 10 gigahertz (billion cycles per second) RF signal enables an accuracy of about 3 centimeters. By measuring amplitude to a quarter wavelength, it is possible to improve the resolution down to about 8 mm. To achieve the resolution of optical systems, frequencies of 50 gigahertz or higher are needed, which are almost as line of sight and as easy to block as optical systems. Multipath and reradiation of the signal are likely to cause additional problems, but these technologies will be ideal for tracking larger volumes with reasonable accuracy, since the required resolution at 100 meter distances is not likely to be as high.

The sensor assembly also includes non-traditional sensors in some embodiments. An exemplary alternative approach may include where the actor (tracked person in the roomspace) is given an unlimited walking area through the use of a rotating sphere, similar to a hamster ball, which contains internal sensors recording the angular movements, removing the need for external cameras and other equipment. Even though this technology could potentially lead to much lower costs for motion capture, the basic sphere is only capable of recording a single continuous direction. Additional sensors worn on the person could be used to record more. Another alternative is using a 6 DOF motion platform with an integrated omni-directional treadmill with high resolution optical motion capture to achieve the same effect. The captured person can walk in an unlimited area, negotiating different uneven terrains.

The sensor assembly may also include passive infrared (PIR) sensors. Passive infrared sensors are sensitive to a person's skin temperature through emitted black body radiation at mid-infrared wavelengths, in contrast to background objects at room temperature. No energy is emitted from the sensor, thus the name "passive infrared" (PIR). This distinguishes it from the electric eye for instance (not usually considered a "motion detector"), in which the crossing of a person or vehicle interrupts a visible or infrared beam. In some cases, microwave-based sensors are utilized in the sensor assembly. These detect motion through the principle of Doppler radar, and are similar to a radar speed gun. A continuous wave of microwave radiation is emitted, and phase shifts in the reflected microwaves due to motion of an object toward (or away from) the receiver result in a heterodynesignal at low audio frequencies.

Alternatively or additionally ultrasonic sensors may be included that use an ultrasonic wave (sound at a frequency higher than a human ear can hear) is emitted and reflections from nearby objects are received (e.g., as in Doppler radar, heterodyne detection of the received field indicates motion). The detected Doppler shift is also at low audio frequencies (for walking speeds) since the ultrasonic wavelength of around a centimeter is similar to the wavelengths used in microwave motion detectors. One potential drawback of ultrasonic sensors is that the sensor can be sensitive to motion in areas where coverage isn't desired, for instance, due to reflections of sound waves around corners. Such extended coverage may be desirable for lighting control, where the point is detection of any occupancy in an area. But for opening an automatic door, for example, one would prefer a sensor selective to traffic in the path toward the door. In the same or other embodiments, the sensor assembly may include a tomographic motion detector. Tomographic motion detection systems sense disturbances to radio waves as they pass from node to node of a mesh network. They have the ability to detect over complete areas because they can sense through walls and other obstructions.

The sensor assembly may include a video camera and video camera software. With the proliferation of inexpensive digital cameras capable of shooting video, it is possible to use the output of such a camera to detect motion in its field of view using software. This solution is particularly attractive when the intention was to record video triggered by motion detection, as no hardware beyond the camera and computer is required. Since the observed field may be normally illuminated, this may be considered another passive technology. However it can also be used in conjunction with near-infrared illumination to detect motion in the "dark" (that is, with the illumination at a wavelength not detected by the human eye).

The motion sensor in the sensor assembly may also be a dual-technology motion detector. Most modern motion detectors use combinations of different technologies. While combining multiple sensing technologies into one detector can help reduce false triggering, it does so at the expense of reduced detection probabilities. For example, many dual-tech sensors combine both a PIR sensor and a microwave sensor into one unit. In order for motion to be detected, both sensors must trip together. This lowers the probability of a false alarm since heat and light changes may trip the PIR but not the microwave, or trees may trigger the microwave but not the PIR. Often, PIR technology will be paired with another model to maximize accuracy and reduce energy usage. PIR draws less energy than microwave detection, and so many sensors are calibrated so that when the PIR sensor is tripped, it activates a microwave sensor. If the latter also picks up a person in a roomspace, then the display system may react to the sensed motion and presence of a person in a particular portion of the roomspace to update or modify the displayed content or operation of the display system.

The sensor assembly may include weight sensors such as in the floor to detect a position of a person in a room. The sensors may use RFID technology or may use thermal imagery/thermography in some cases. In some embodiments, MEMS sensor chips are built into props or clothing worn by person in the room/space. Other embodiments utilize microelectromechanical sensors such as accelerometers, gyroscopes, digital compasses, inertial modules, pressure sensors, humidity sensors, and microphones. Some embodiments use smart sensors, sensor hubs, UV index sensors, temperature sensors, and/or touch sensors. The sensors may be special purpose or be provided with off-the-shelf devices such as Kinect or Affectiva facial/emotion sensing products. Note, some motion sensing products may be less invasive to the person's privacy if the imagery is retained digitally for analysis but not produced for human viewing.

The sensor assembly and display system may be configured to look at active force sensors in the floor/furniture that sense a person is standing/sitting/laying on an object or in a particular place in the room. The system may include thermo cameras as part of the optical sensing. Electromagnetic tracking may be utilized; for example, the system can locate a person in the room/space based on disturbances in the room's EMF. In other cases, directional acoustic-based sensor technology such as directional microphones may be used. The display system with its sensor assembly and processing software/hardware may be also adapted to track a person in the room/space based on the direction your voice is coming from or the sound they make when they move around and interact with props or objects in the room. The objects or props in the rooms may also be adapted to take advantage of (or include) Internet of Things (IoT) technologies, e.g., to allow tracking a lamp (or other object in the room/space) and knowing when a person in the room/space is touching or operating it.

In some embodiments, the guest or person in the room/space (such as room/space 110 in FIG. 1) has the option of providing user input to choose how much "sensoring" they are comfortable with and want the display system to perform to customize or modify the display content and operations of the display system. In this way, the participant is in complete control over whether or not sensors (such as cameras) are activated in a particular space. For example, the display system may have different operating modes such as one where higher privacy levels are desired, and, in such cases, only the relatively "dumb" sensors may operate such as to sense movement/use of a prop or location of a person in a particular portion of a space. In another operating mode, such as low privacy or full VR mode, the display system may use all of its sensing capabilities with the participant's permission including capturing images and so on for use in modifying display content and/or system operations.

We claim:

1. A system for providing interactive entertainment with multimedia content matched to a particular room, comprising:
    a display device positioned in a room;
    a projector positioned in the room for projecting on one or more surfaces in the room;
    an audio system for providing audio output into the room;
    a sensor assembly including one or more sensors sensing user input in the room;
    a controller processing the user input sensed by the sensor assembly and, in response, operating, based on the user input and on a file defining display content, projector content, and audio content for an interactive experience, the display device to display the display content, the projector to project the projector content onto the one or more surfaces in the room, and the audio system to output the audio content for the interactive experience into the room; and
    a lighting system with lighting elements that are independently operable to turn on and off, to have a range of brightness, and to have two or more colors, wherein the file defines lighting for the interactive experience, and wherein the controller operates each of the lighting elements to provide the lighting defined by the file including modifying operations of one or more of the lighting elements based on location or movement of a visual element in the projector content on the one or more surfaces in the room.

2. The system of claim 1, wherein the one or more sensors include at least one of a motion sensor, a pressure sensor, a microphone, and a camera.

3. The system of claim 1, wherein the user input includes at least one of motion of a person or object, determining a position of an object or person in a location in the room, facial recognition, audio recognition, and person or object identification.

4. The system of claim 1, wherein the display content, the projector content, and the audio content are time synchronized to each other based on a timeline for the interactive experience and wherein the projector content is mapped to the one or more surfaces in the room using projection mapping.

5. The system of claim 4, wherein the display device comprises a television mounted on a wall of the room, wherein the projector content comprises video content matching the display content displayed on the television, and wherein the display device and the projector are concurrently operated for at least a portion of the interactive experience.

6. The system of claim 5, wherein the projection mapping includes the television and the video content includes a blacked out area coinciding with an area of the wall where the television is mounted, wherein light output from the projector is projected on surfaces of the wall excluding the television.

7. The system of claim 6, wherein the audio system includes speakers spaced around the room to provide surround sound and wherein the audio content includes a soundtrack matching both the display content and the projector content.

8. A system for providing interactive in-room entertainment, comprising:
    a room defined by one or more walls;
    a plurality of show components including a set of speakers and a video projector;
    a sensor sensing activity of a person in the room; and
    a controller running a program processing the sensed activity and in response generating a set of control signals to operate each of the plurality of show components including playing a soundtrack on the set of speakers and the video projector to project video mapped to a surface of at least one of the one or more walls, wherein at least one of the set of speakers is independently operated by the controller to play a portion of the soundtrack based on a location of a visual element in the projected video on the surface of the at least one of the one or more walls; and
    a lighting system with lighting elements that are independently operable to turn on and off, to have a range of brightness, or to have two or more colors, wherein the program defines lighting for the interactive in-room entertainment and wherein the controller operates the lighting elements to provide the lighting defined by the program including modifying operations of one or more of the lighting elements based on the projected video on the surface of the at least one of the one or more walls.

9. The system of claim 8, further including a display device mounted proximate to the surface of the at least one of the walls, wherein the controller operates the display device to display content matched to the projected video.

10. The system of claim 9, wherein the display device is operated to provide the displayed content sequentially and concurrently with the projected video from the video projector.

11. The system of claim 8, wherein the sensed activity includes one of motion of the person or an object in the room, determining a position of an object or the person in a location in the room, facial recognition, audio recognition, and identification of the person or an object in the room.

12. The system of claim 11, wherein the controller processes a signal from the sensor corresponding to the sensed activity to identify or generate a show file and wherein the show file defines operation of each of the show components over a timeline defined for a particular show or interactive game for the room.

13. A method of providing in-room entertainment, comprising:
    with a sensor, sensing user input from a person in a room;
    based on the sensed user input, displaying a first set of content;

based on the sensed user input, projecting a second set of content on one or more surfaces of the room;

playing a soundtrack associated with the first and second sets of content; and operating a lighting system with lighting elements positioned at one or more locations within the room to provide lighting for the room, wherein the operating includes modifying operations of one or more of the lighting elements based on location or movement of a visual element in the projected second set of content on the one or more surfaces of the room, wherein, during the displaying and the projecting, the first and second sets of content share a subset of content, the subset of content moving completely off a display device operated to perform the displaying and onto the one or more surfaces of the room as part of the second set of content.

14. The method of claim 13, wherein the first and second sets of content are time synchronized and are defined by a show or game file.

15. The method of claim 13, wherein the second set of content is mapped to the one or more surfaces of the room, the displaying is performed by a display device includes a television on a wall, and the second set of content includes a blacked out area associated with the television to limit projection of light onto the television.

16. The method of claim 13, wherein the sensor includes at least one of a motion detector, a pressure sensor, a microphone, and a camera and wherein the sensing includes, respectively, one of detecting motion, detecting location of the person or an object in the room, receiving and processing speech of the person in the room, and processing an image of the room.

* * * * *